US010733783B2

(12) United States Patent
Vlachos et al.

(10) Patent No.: US 10,733,783 B2
(45) Date of Patent: Aug. 4, 2020

(54) MOTION SMOOTHING FOR RE-PROJECTED FRAMES

(71) Applicant: Valve Corporation, Bellevue, WA (US)

(72) Inventors: Alex Vlachos, Bellevue, WA (US); Aaron Leiby, Seattle, WA (US)

(73) Assignee: Valve Corporation, Bellevue, WA (US)

(*) Notice: Subject to any disclaimer, the term of this patent is extended or adjusted under 35 U.S.C. 154(b) by 7 days.

(21) Appl. No.: 16/155,686

(22) Filed: Oct. 9, 2018

(65) Prior Publication Data
US 2020/0111195 A1 Apr. 9, 2020

(51) Int. Cl.
G06T 15/00 (2011.01)
G06T 17/20 (2006.01)
G06T 15/04 (2011.01)
G06T 19/00 (2011.01)
H04N 5/14 (2006.01)

(52) U.S. Cl.
CPC ............ *G06T 15/005* (2013.01); *G06T 15/04* (2013.01); *G06T 17/20* (2013.01); *G06T 19/006* (2013.01); *H04N 5/145* (2013.01)

(58) Field of Classification Search
CPC .................................................... G06T 19/006
See application file for complete search history.

(56) References Cited

U.S. PATENT DOCUMENTS

| 2002/0113752 | A1  | 8/2002  | Sullivan et al. |           |
|--------------|-----|---------|-----------------|-----------|
| 2007/0110417 | A1* | 5/2007  | Itokawa         | G06T 5/50 |
|              |     |         |                 | 396/52    |
| 2008/0240617 | A1* | 10/2008 | Douniwa         | G06T 3/4007 |
|              |     |         |                 | 382/300   |
| 2009/0109342 | A1* | 4/2009  | Heng            | H04N 19/513 |
|              |     |         |                 | 348/699   |
| 2012/0021828 | A1  | 1/2012  | Raitt et al.    |           |
| 2012/0182299 | A1  | 7/2012  | Bowles et al.   |           |
| 2013/0083854 | A1  | 4/2013  | Pace            |           |
| 2014/0307787 | A1* | 10/2014 | Zheng           | H04N 19/597 |
|              |     |         |                 | 375/240.12 |
| 2014/0362240 | A1  | 12/2014 | Klivington et al. |         |
| 2016/0350965 | A1* | 12/2016 | Lum             | G06T 15/005 |
| 2017/0213388 | A1  | 7/2017  | Margolis et al. |           |

(Continued)

OTHER PUBLICATIONS

PCT Search Report and Written Opinion dated Dec. 2, 2019 for PCT Application No. PCT/US2019/053528, 13 pages.

(Continued)

*Primary Examiner* — Daniel F Hajnik
(74) *Attorney, Agent, or Firm* — Lee & Hayes, P.C.

(57) ABSTRACT

Described herein are motion smoothing techniques for a display system to account for motion of moving or animating objects in a way that mitigates judder. For example, first pixel data and second pixel data associated with two previously-rendered frames may be provided to a graphics processing unit (GPU) as input. The video encoder of the GPU can process the input pixel data to generate an array of motion vectors which is used to modify third pixel data of a re-projected frame. The modified third pixel data for the re-projected frame is "motion-smoothed" for rendering on a display, such as a head-mounted display (HMD), in a manner that mitigates judder of moving or animating objects.

24 Claims, 16 Drawing Sheets

(56) References Cited

U.S. PATENT DOCUMENTS

2017/0374341 A1* 12/2017 Michail .................. G06T 3/60
2018/0005449 A1*  1/2018 Wallner ................. G06T 15/04
2019/0045213 A1*  2/2019 Raut .................... H04N 19/537
2019/0333263 A1* 10/2019 Melkote Krishnaprasad .............
                                                    H04N 13/383

OTHER PUBLICATIONS

Yuan et al, "Simplified and Tessellated Mesh for Realtime High Quality Rendering", retrieved on Nov. 9, 2019 at <>https://www.sciencedirect.com/science/article/abs/pii/S0097849315001144>>, Computers & Graphics, vol. 54, Feb. 2016, 13 pages.

* cited by examiner

BEFORE MOTION SMOOTHING

AFTER MOTION SMOOTHING

MOTION SMOOTHING FOR RE-PROJECTED FRAMES

BACKGROUND

Virtual reality (VR) systems are used both within and outside of the video game industry. Displays for VR systems, such as those embedded in a VR headset, typically operate at a minimum refresh rate that is suitable for VR applications. For instance, 90 Hertz (Hz) is a common refresh rate for VR displays. In a "live rendering" scenario, a graphics-based application, such as a video game, outputs frames for rendering at a frame rate that matches the refresh rate of the display, meaning that a new frame received from the application (referred to herein as an "actual frame") is displayed at every screen refresh. Such a live rendering scenario is often referred to as the application "hitting frame rate."

In practice, an application does not always hit frame rate for various reasons. For example, the application may intermittently drop a frame, and/or the application may temporarily output frames at a slower rate (e.g., 45 frames per second when the ideal frame rate is 90 frames per second). In situations where the application is not hitting frame rate, a technique called "rotation-only re-projection" can be used to replace missing frames with re-projected frames in a way that accounts for the user's head rotation, making it appear to the user as if the application is hitting frame rate. Without re-projection, for example, a deficient frame rate from the application may cause in-game stuttering or hitching. In VR applications, where the user is fully immersed in the virtual environment, the user can become nauseous if the application fails to hit frame rate and there is no re-projection to compensate for the missing frames. Thus, re-projection is a technique that allows for a better user experience when an application is not hitting frame rate. Consider an example where the application is outputting frames at half the ideal frame rate (e.g., 45 frames per second where 90 frames per second is the ideal frame rate). In this example, every other frame can be re-projected using pixel data from the most recently-rendered actual frame to create a re-projected frame that transforms the scene (e.g., through rotation and re-projection calculations) to match the re-projected scene to the user's current head orientation. This makes it look to the user as if the scene is moving in a way that is expected given the user's head rotation, even when re-projected frames are used to compensate for the application failing to hit frame rate.

Although rotation-only re-projection prevents in-game stuttering or hitching, it produces its own unwanted visual artifacts during head rotation, at least in VR systems that use low-persistence displays (e.g., where the display is illuminated for a small fraction of the frame time). For example, although rotation-only re-projection accounts for head rotation, it does not account for virtual objects that move or animate in the scene between frames. This can cause an unwanted visual artifact called "judder" to occur with respect to moving or animating objects. Judder causes the user to perceive a "double ghosting effect" where a moving object (e.g., a bullet or a ball moving across the screen) appears to bounce between two locations (or separate from itself) frame-to-frame. Accordingly, when the user rotates his/her head while re-projection is being used, any moving or animating objects in the scene will judder.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
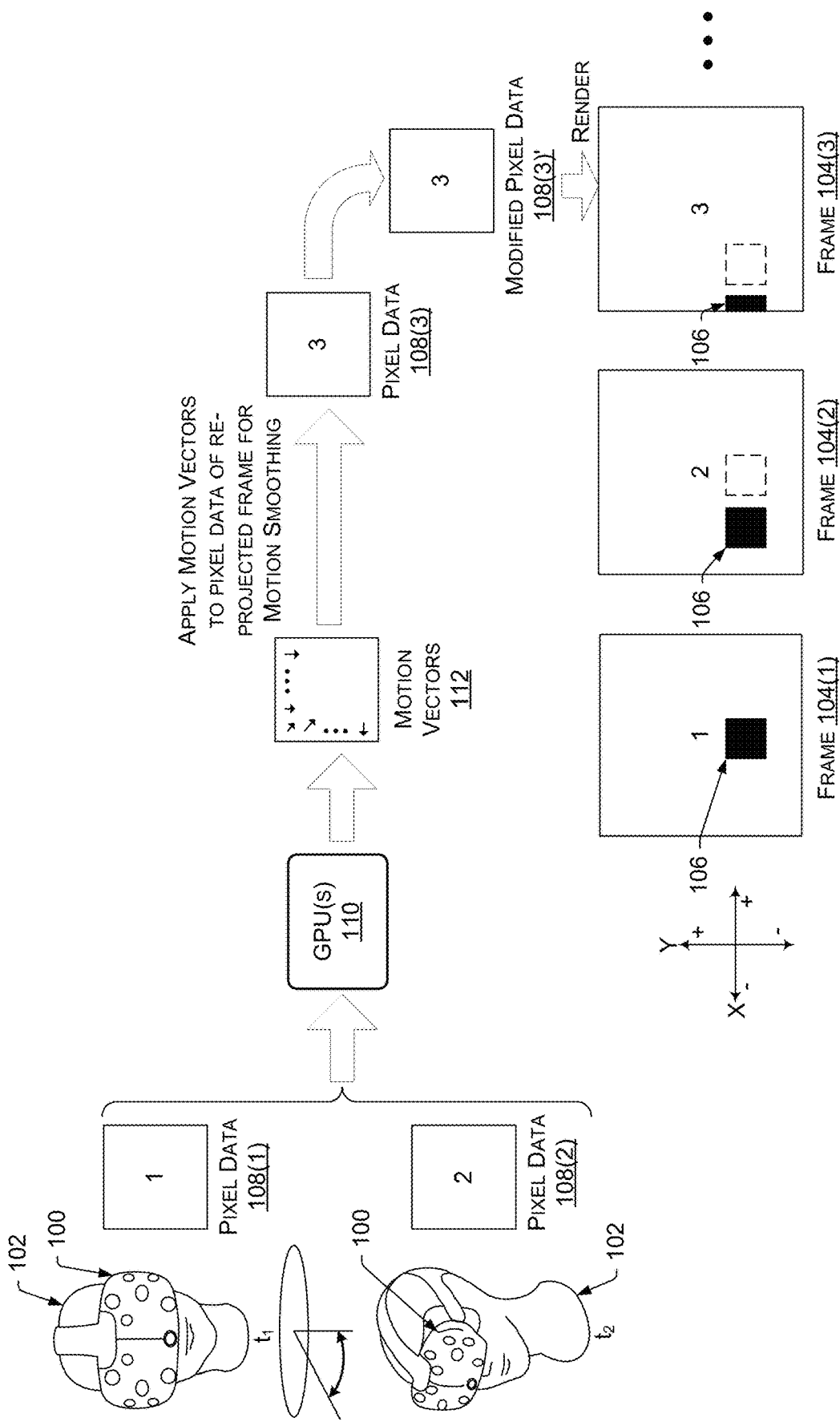
FIG. 1 is a diagram illustrating an example motion smoothing technique to account for moving or animating objects in a scene when re-projection is being used to render frames on a display, such as a head-mounted display (HMD).

Described herein are, among other things, motion smoothing techniques to account for moving or animating objects in a scene when re-projection is being used to render frames on a display, such as a head-mounted display (HMD). The motion smoothing techniques described herein mitigate unwanted visual artifacts with respect to moving or animating objects, such as the aforementioned judder artifact for moving or animating objects. A HMD is an example type of display that can implement the disclosed motion smoothing techniques when rendering images on the display. A HMD may be worn by a user for purposes of immersing the user in a virtual reality (VR) environment or an augmented reality (AR) environment. One or more display panels of the HMD render images based on frames that are output by an application (e.g., a video game), and these images are viewed by a user through the optics that are included in the HMD, making the user perceive the images as if the user was immersed in a VR or AR environment.

As mentioned, the HMD may utilize a technique called "re-projection" to compensate for the application failing to hit frame rate. For example, re-projected frames can be rendered between actual frames to achieve an ideal frame rate, and each re-projected frame can be generated using pixel data from a recently-rendered actual frame that was received from an application (e.g., the most recently-rendered actual frame). In the re-projected frame, a scene rendered in the previous actual frame is transformed (e.g., through rotation and re-projection calculations) in a way that accounts for the user's head rotation.

Described herein are motion smoothing techniques that are used to generate re-projected frames that further account for the motion of objects that move or animate frame-to-frame. The motion smoothing techniques described herein use computer vision algorithms to estimate the motion (e.g., direction and magnitude) of objects over multiple frames in the form of motion vectors. The motion vectors can be obtained using the video encoder (e.g., the video encode chip) of a graphics processing unit (GPU). For example, the video encoder of the GPU can analyze pixel data of multiple, previously-rendered frames to generate an array of motion vectors, and these motion vectors can be used to modify the pixel data of a re-projected frame in a way that accounts for moving or animating objects. Said another way, the motion vectors received from the GPU can be used to extrapolate (from the object's motion in the previously-rendered frames) where the object should be located in a to-be-rendered re-projected frame so that judder of the moving object is mitigated.

In an example motion smoothing process, first pixel data and second pixel data associated with a first frame and a second frame, respectively, may be provided as input to a graphics processing unit (GPU). The first frame and the second frame may have been received from an application and previously rendered in the past (e.g., the two most recently rendered actual frames from the application). The video encoder of the GPU can process the input pixel data to generate an array of motion vectors. Third pixel data may be generated for a re-projected frame (which is a future, to-be-rendered frame) based at least in part on the second pixel data associated with the second frame, and this third pixel data can be further modified based at least in part on the array of motion vectors received from the GPU. This modified third pixel data for the re-projected frame is "motion-smoothed" in order to mitigate, if not eliminate, any judder with respect to moving or animating objects in the scene. The motion-smoothed re-projected frame can then be rendered on a display based at least in part on the modified third pixel data to provide a more realistic viewing experience where objects move or animate within the scene in an expected fashion, even when the application is not hitting frame rate. Accordingly, the array of motion vectors received from the GPU are used to extrapolate to a future frame (the re-projected frame) because the modified third pixel data is output to a frame buffer after outputting the first pixel data and the second pixel data to the frame buffer. In this manner, the first frame is rendered before the second frame, and the second frame is rendered before the re-projected frame. This extrapolation technique can be contrasted with interpolating between frames, and it is to be appreciated that the techniques and systems described herein pertain to using motion vectors received from a GPU to extrapolate to a future frame, as opposed to using the motion vectors for interpolating between frames.

Also disclosed herein are systems, for example, systems including a display system (e.g., a HMD), configured to implement the techniques and processes disclosed herein, as well as non-transitory computer-readable media storing computer-executable instructions to implement the techniques and processes disclosed herein. Although the techniques and systems disclosed herein are discussed, by way of example, in the context of video game applications, and specifically VR gaming applications, it is to be appreciated that the techniques and systems described herein may provide benefits with other applications, including, without limitation, non-VR applications (e.g., AR applications), and/or non-gaming applications, such as industrial machine applications, defense applications, robotics applications, and the like.

FIG. 1 is a diagram illustrating an example motion smoothing technique to account for moving or animating objects in a scene when re-projection is being used to render frames on a display, such as a head-mounted display (HMD) 100. Although a HMD 100 is presented herein as an example "display system" that can implement the disclosed motion smoothing techniques, it is to be appreciated that other types and/or implementations of a "display system" may implement the motion smoothing techniques described herein. Accordingly, it is to be understood that any reference to "HMD" herein may be substituted with the term "display" or "display system," even though it is to be appreciated that a HMD is merely an example type of display for implementing the techniques described herein.

The HMD 100 in the example of FIG. 1 may include multiple display panels, such as a left display panel and a right display panel of a stereo pair of display panels. These display panels may be used to present a series of image frames (herein referred to as "frames") that are viewable by a user 102 wearing the HMD 100. Although examples are described with a two-panel HMD 100, it is to be appreciated that the HMD 100 may include a single display panel, or more than two display panels. Hence, the terms "display panel," as used herein, may refer to either display panel of a pair of display panels of a two-panel HMD 100, or it may refer to a single display panel of a HMD 100 with any number of display panels (e.g., a single-panel HMD 100 or a multi-panel HMD 100). In a two-panel HMD 100, a stereo frame buffer may render, for instance, 2160×1200 pixels on both display panels of the HMD 100 (e.g., 1080×1200 pixels per display panel).

The HMD 100 may include display panels that utilize any suitable type of display technology, such as an emissive display that utilizes light emitting elements to emit light during presentation of frames on the display panel(s) of the HMD 100. As an example, display panels of the HMD 100 may comprise liquid crystal displays (LCDs), organic light emitting diode (OLED) displays, inorganic light emitting diode (ILED) displays, or any other suitable type of display that utilizes a suitable display technology for HMD applications.

The HMD 100 may represent a VR headset for use in VR systems, such as for use with a VR gaming system. However, the HMD 100 may additionally, or alternatively, be implemented as an AR headset for use in AR applications. In AR, a user 102 sees virtual objects overlaid on a real-world environment, whereas, in VR, the user 102 does not see a real-world environment, but is fully immersed in a virtual environment, as perceived via the display panels and the optics (e.g., lenses) of the HMD 100. Examples described herein pertain primarily to a VR-based HMD 100, but it is to be appreciated that the HMD 100 is not limited to implementation in VR applications.

In general, an application executing on a computing device—such as the HMD 100 itself, or a computing device (e.g., a personal computer (PC), game console, etc.) associated with, and coupled to, the HMD 100—may be configured to output a series of frames 104 that are ultimately rendered on the display panel(s) of the HMD 100. In some embodiments, off-screen rendering is utilized such that the frames 104 can be rendered to a target before being rendered on a display panel of the HMD 100. Thus, "rendering," as used herein, can include rendering to a target other than a display and before rendering on the display itself, and/or rendering on the display (e.g., without, or after, off-screen rendering to a different target).

The example of FIG. 1 depicts three example frames 104(1), 104(2), and 104(3) that are to be rendered in sequence as a series of frames 104. In the example of FIG. 1, an object 106 is shown to be moving across a scene in a leftward direction (i.e., from right to left) over the course of the frames 104(1)-104(3). The dotted outline of the object 106 in frames 104(2) and 104(3) represents the location where the object 106 was located in the previously-rendered frame 104. Here, frame 104(1) is rendered first, then frame 104(2) is rendered second, and then frame 104(3) is rendered third.

At least some of the frames 104 in the series of frames 104 may be "actual" frames in the sense that they are output from an application, such as video game application, or any other type of graphics-based application. The application may be executed in a graphics pipeline that outputs pixel data 108 to a frame buffer for rendering the individual frames 104. Pixel data 108 may, in some embodiments, include a two-dimensional array of per-pixel values (e.g., color values). In some embodiments, the pixel data 108 further includes additional data or metadata, such as depth values, luminance values, etc. In some embodiments, pixel data 108 may include data for each pixel that is represented by a single set of color and alpha values (e.g., one color value for a red channel, one color value for a green channel, one color value for a blue channel, and one or more values for one or more alpha channels). This pixel data 108 can be output to a frame buffer to present on image on the display panel(s) of the HMD 100 with a desired visual effect.

During runtime, a head tracking module of the HMD 100 may generate data about the position and pose of the HMD 100 that is provided to the application in order to inform the application regarding how to render a next frame 104 in the series of frames 104 in accordance with the user's 102 head position/pose. This allows for the application to output pixel data 108 for rendering imagery on the HMD 100 in a way that makes the user 104 believe he/she is looking around a virtual environment that includes objects (both static and moving objects, such as the moving object 106). Both static and moving objects are perceived to move within the scene in an expected manner along with the user's 102 head movement if the application is hitting frame rate. The motion smoothing techniques described herein are a way to compensate for the application failing to hit frame rate so that a similar visual perception is achieved with respect to moving objects.

In the example of FIG. 1, the first frame 104(1) may represent a first "actual" frame that is received from an application, the second frame 104(2) may represent a second "actual" frame received from the application and rendered after the first frame 104(1), and the third frame 104(3) may represent a re-projected frame that is generated from pixel data 108(2) associated with the second frame 104(2). Hence, the "third frame 104(3)" in FIG. 1 is sometimes referred to herein as the "re-projected frame 104(3)." The HMD 100 may process the series of frames 104, and, at a time after rendering the first frame 104(1) and the second frame 104(2), logic of the HMD 100 may be configured to provide, as input to a graphics processing unit (GPU) 110 (e.g., a GPU 110 of the HMD 100), first pixel data 108(1) associated with the first frame 104(1) and second pixel data 108(2) associated with the second frame 104(2).

A video encoder (e.g., a video encode chip) of the GPU 110 may generate an array of motion vectors 112 based on the first pixel data 108(1) and the second pixel data 108(2) that was input to the GPU 110. In order to generate the array of motion vectors 112, the video encoder of the GPU 110 may compare per pixel values (e.g., luminance values) between the pixel data 108 of each frame 104 that was provided as input. Additionally, or alternatively, the video encoder of the GPU 110 may compare macroblocks (e.g., a block of 16 pixels (i.e., 4×4 pixel macroblock), a block of 64 pixels (i.e., 8×8 pixel macroblock)) between the pixel data 108 of each frame 104 that was provided as input. In this manner, the GPU 110 may compare portions of the pixel data 108 between a pair of frames 104 at any suitable resolution. In some embodiments, the input pixel data 108

(1) and 108(2) is down-sampled to a lower resolution in order to input down-sampled frames to the GPU 110.

The array of motion vectors 112 output from the GPU 110 is sometimes referred to herein as a "motion vector field 112". This motion vector field 112 can also be output at, and/or down-sampled/up-sampled to, any suitable resolution. For instance, the array of motion vectors 112 may include a single motion vector 112 per pixel, a single motion vector 112 per group of pixels (e.g., one motion vector 112 for a 4×4 macroblock, an 8×8 macroblock, an arbitrary shaped patch of pixels, etc.), or even a single motion vector 112 for all of the pixels for a given frame 104. In general, a motion vector 112 is a two-dimensional (2D) arrow having an X and Y component for direction, and a magnitude (typically represented by a length of the 2D arrow). The magnitude of a motion vector 112 may be specified in any suitable unit of measurement, such as a number of pixels in both X and Y component directions.

Based on the comparison of the input pixel data 108 by the video encoder of the GPU 110, if a portion of the second frame 104(2) is similar to (e.g., within a threshold luminance value of) a portion of the first frame 104(1), and if the similar portion in each frame 104 are offset by a distance (e.g., number of pixels in X and Y component directions), this can be represented by a motion vector 112 that is included in the array of motion vectors 112. Consider an example where the pixel values corresponding to the object 106 in frames 104(1) and 104(2) are determined, by the video encoder of the GPU 110 to be similar (e.g., matching portions that satisfy some similarity metric based on the pixel values in the pixel data 108). The motion vector 112 for this object 106 may have a direction that points in the same direction as the movement of the object 106, or the motion vector 112 may point in the opposite direction to that of the direction of movement of the object 106. In other words, the motion vector 112 may point in a direction that refers back to a location of the object 106 in the previous frame 104(1) that is offset from a location of the object 106 in the subsequent frame 104(2). Thus, a motion vector 112 provides an offset from the coordinates in the second frame 104(2) to the coordinates in the first frame 104(1). The offset describes the transformation from the image in the first frame 104(1) to the image in the second frame 104(2) with respect to moving or animating objects, such as the object 106.

As mentioned, the third frame 104(3) in FIG. 1 may represent a re-projected frame, which means that the pixel data 108(3) for the third frame 104(3) may be derived from the pixel data 108(2) associated with a previously-rendered actual frame (in this case, the second frame 104(2)). In other words, the pixel data 108(3) for the re-projected frame 104(3) is not received from an application (e.g., a video game application), but is generated from the pixel data 108 of the application-generated frames and is used to "fill-in" the gaps of missing frames when the application is not hitting frame rate. In this case, the pixel data 108(3) for the re-projected frame 104(3) is generated from the pixel data 108(2) associated with the second frame 104(2) because the second frame 104(2) is the most recently-rendered frame 104 prior to the re-projected frame 104(3), in the example of FIG. 1. In some embodiments, rotation and re-projection transforms may be calculated and used to modify the second pixel data 108(2) associated with the second frame 104(2) in order to generate the third pixel data 108(3) for the re-projected frame, which effectively rotates, translates, and/or otherwise moves the scene that was rendered in the second frame 104(2) in such a manner that accounts for rotation of the HMD 100 since the second frame 104(2) was rendered.

For example, the user 102 may rotate his/her head since a time when the second frame 104(2) is rendered, which is accounted for in the generation of the third pixel data 108(3) for the re-projected frame 104(3) so that the scene is presented in accordance with this head movement.

The motion smoothing technique of FIG. 1 then modifies the third pixel data 108(3) based at least in part on the array of motion vectors 112 to obtain modified third pixel data 108(3)' for the re-projected frame 104(3). In some embodiments, this modification of the third pixel data 108(3) into modified third pixel data 108(3)' includes moving pixel values of the third pixel data 108(3) to different locations based on non-zero motion vectors 112 that correspond to particular pixels or groups of pixels. The movement may be in a direction and by an amount (e.g., moving a number of pixels in horizontal(+/−) and vertical(+/−) directions). The re-projected frame 104(3) is then rendered on a display (e.g., on a display panel of the HMD 100) based at least in part on the modified third pixel data 108(3)'. Thus, the re-projected frame 104(3), having been modified based on the motion vectors 112 (the motion vectors 112 having been generated from the pixel data 108 of the previously-rendered actual frames 104(1) and 104(2)), is "motion-smoothed" to render the object 106 in an expected position.

Figure 2:
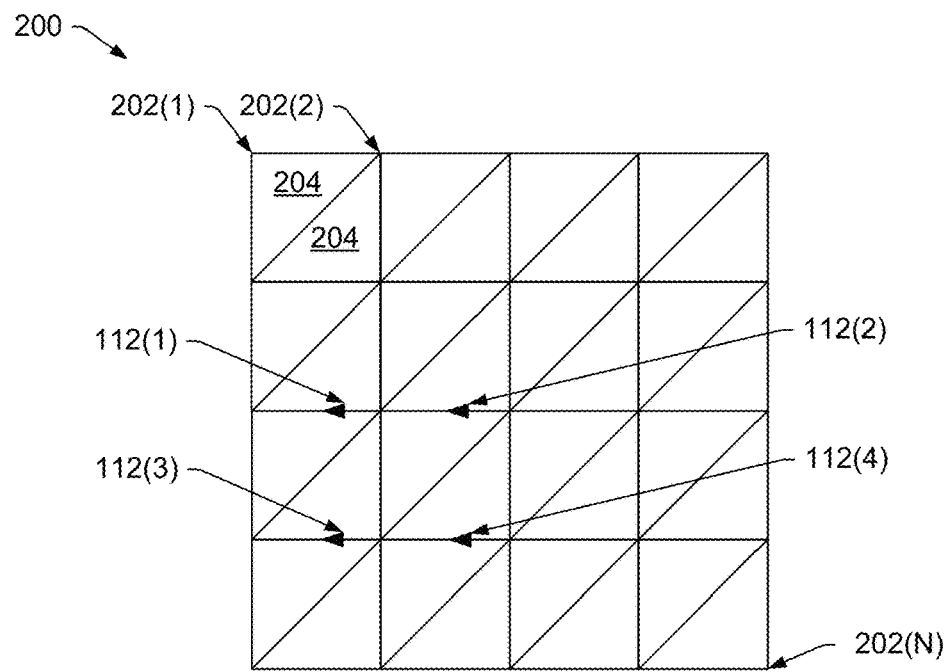
FIG. 2 is a diagram illustrating an example render mesh and how the render mesh can be used in motion smoothing for re-projected frames.
Figure 2:
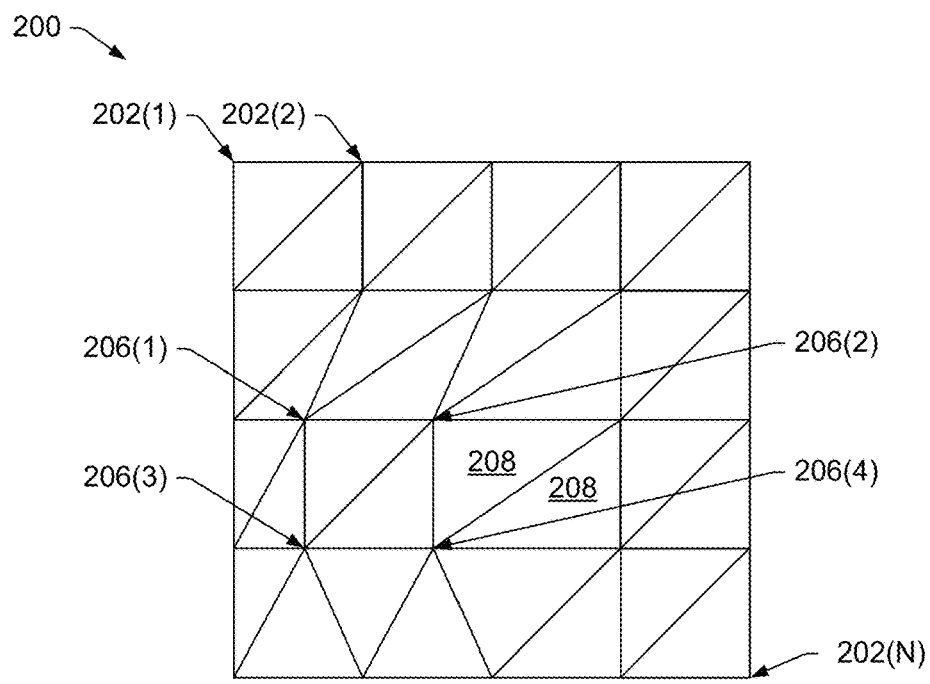

FIG. 2 is a diagram illustrating an example render mesh 200 and how the render mesh 200 can be used in motion smoothing for re-projected frames. For example, the render mesh 200 can be used to modify the third pixel data 108(3) for the re-projected frame 104(3) of FIG. 1 based on the array of motion vectors 112 output by the GPU 110. In this example, logic of the HMD 100 may generate the render mesh 200, and vertices 202 of the render mesh 200 can be moved according to the array of motion vectors 112. For instance, the vertices 202 may be moved in directions of non-zero motion vectors 112, and by amounts corresponding to magnitudes of the non-zero motion vectors 112. For instance, taking the leftward moving object 106 shown in FIG. 1 as an example, a motion vector 112 may be applied in the context of the render mesh 200 to move a vertex 202 a particular number of pixels (corresponding to the magnitude of the motion vector 112) in a leftward (or negative X) direction.

The render mesh 200 is shown as a tessellated mesh having a plurality of vertices 202(1), 202(2), . . . , 202(N) (collectively 202). The tessellation of the render mesh 200 can be in any suitable geometric pattern. The example render mesh 200 of FIG. 2 is shown as a repeating pattern of triangles 204, although any suitable geometric shape can be used for the render mesh 200, including, without limitation, squares (sometimes referred to as "quads"), hexagons (e.g., for a honeycomb pattern), etc. In this example, a diagonal line from a bottom left corner of a square (or quad) to a top right corner of the square (or quad) is used to create the render mesh 200 of repeating triangles 204 having a particular orientation. A different orientation for the render mesh 200 can be created by dividing the squares (or quads) into triangles 204 using a diagonal line from a top left corner of the square (or quad) to a bottom right corner of the square (or quad), instead of the orientation shown in FIG. 2. In some embodiments, a mixture of these different orientations can also be used for a single render mesh 200, such as by dividing every other square using a diagonal line from a bottom left corner of the square (or quad) to a top right corner of the square (or quad), and dividing the squares in between using a diagonal line from a top left corner of the square (or quad) to a bottom right corner of the square (or quad). In some embodiments, logic of the HMD 100 may be configured to dynamically determine which orientation, of these multiple orientations, to use in generating the render mesh 200, based on the motion vector field 112 received from the GPU 110. This might be done to choose the best orientation for the geometric shapes (e.g., triangles 204) in the render mesh 200 that results in a smoothest looking, motion-smoothed image.

The render mesh 200 can also be generated at any suitable resolution. For example, a highest resolution render mesh 200 might be two adjoined triangles 204 per pixel, where each square (or quad) is mapped to a single pixel. A lower resolution might be two adjoined triangles 204 per a group of pixels, such as a group of 16 pixels. Alternatively, pixels may be mapped to the vertices 202 of the render mesh 200 at any suitable resolution. For instance, each vertex 202 might be associated with a single pixel at a highest resolution, or each vertex 202 might be associated with a group of pixels, such as a group of 16 pixels, at a lower resolution. In some embodiments, the resolution of the render mesh 200 is a same resolution as the resolution of the array of motion vectors 112 such that a single motion vector 112 in the array of motion vectors 112 maps to a vertex 202 or to a square (or quad) (e.g., two adjoined triangles 204). Achieving a matching resolution between the render mesh 200 and the array of motion vectors 112 can be accomplished in various ways, such as by requesting, from the GPU 110, an array of motion vectors 112 at a particular resolution that matches a resolution of the render mesh 200, by down-sampling or up-sampling the array of motion vectors 112 to match the resolution as the render mesh 200, or by generating the render mesh 200 at a resolution that matches the resolution of the array of motion vectors 112 that is output by the GPU 110.

FIG. 2 shows an example where four non-zero motion vectors 112(1), 112(2), 112(3), and 112(4) correspond to four vertices 202 of the render mesh 200. These four motion vectors 112(1)-(4) might correspond to motion vectors 112 that the GPU 110 detected based on the moving object 106 depicted in FIG. 1. Accordingly, the example motion vectors 112(1)-(4) may point in a leftward direction that corresponds to the directional motion of the object 106, although, as mentioned, the directionality may be opposite to that of the directional motion of an object 106 (e.g., in a rightward direction). Directionality of the motion vectors 112, may be taken into account in the motion smoothing algorithm to modify the pixel data 108 in the desired direction. Consider a basic example where the field of motion vectors 112 includes the four example motion vectors 112(1)-(4), and all of the remaining motion vectors 112 in the array of motion vectors 112 are zero vectors. In this example, the pixel data 108(3) for a re-projected frame 104(3) can be modified based on the non-zero motion vectors 112(1)-(4) by moving the vertices 202 that correspond to the non-zero motion vectors 112(1)-(4) to different locations within the render mesh 200 as moved vertices 206(1), 206(2), 206(3), and 206(4) (shown at the bottom of FIG. 2). The bottom of FIG. 2 shows the render mesh 200 after motion smoothing has been applied, where the moved vertices 206(1)-(4) are in different locations within the render mesh 200 as compared to the locations of the vertices 202 before motion smoothing. When the motion vectors 112 are applied in this manner, the moved vertices 206(1)-(4) cause one or more portions of the render mesh 200 to distort, such as by stretching or warping particular ones of the geometric shapes (e.g., triangles 204) in the render mesh 200. In the example of FIG. 2, some of the triangles 204 are stretched as a result of motion smoothing to create stretched triangles 208, as shown at the bottom of FIG. 2. The pixel values (of the pixel data 108(3) for the re-projected frame 104(3)) that correspond to the moved vertices 206(1)-(4) are rendered at different pixels locations that correspond to the locations of the moved vertices 206(1)-(4) within the render mesh 200. Pixel locations between the moved vertices 206(1)-(4) and the non-moved vertices 202 may be blended (e.g., by applying a gradient, such as by interpolating the pixel values between the moved vertices 206(1)-(4) and the non-moved vertices 202). In some embodiments, a depth buffer can be utilized to determine a final set of pixel values that are output to a frame buffer of the modified pixel data 108(3)' for the re-projected frame 104(3). That is, there may be multiple pixel values at the location in the image corresponding to the moved vertices 206(1)-(4) as a result of applying the motion vectors 112 to the render mesh 200. In this case, whichever pixels values are associated with a "closer" (smaller) depth value may be rendered in lieu of rendering another pixel value at that location that is associated with a "farther" (greater) depth value.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
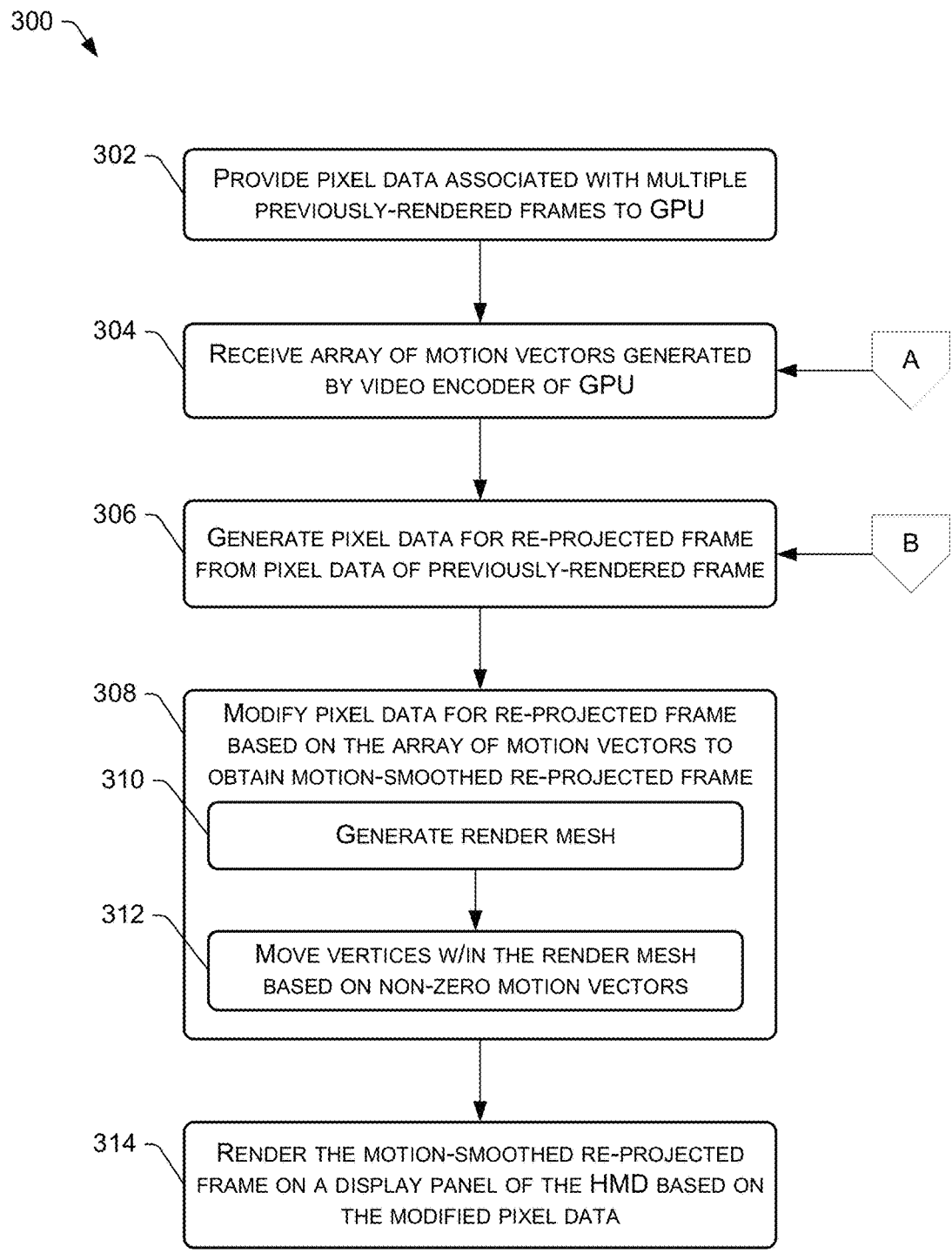
FIG. 3 is a flow diagram of an example process for generating a re-projected frame using motion vectors generated by a graphics processing unit (GPU) as part of a motion smoothing technique, in accordance with embodiments disclosed herein.

FIG. 3 is a flow diagram of an example process 300 for generating a re-projected frame using motion vectors generated by a GPU as part of a motion smoothing technique, in accordance with embodiments disclosed herein. For discussion purposes, the process 300 is described with reference to the previous figures.

At 302, logic of a display system (e.g., logic of a HMD 100) may provide pixel data 108 associated with previously-rendered frames 104 as input to a GPU 110. For instance, pixel data 108 associated with the two most recently rendered frames 104 may be provided as input to the GPU 110 (e.g., a GPU 110 of the HMD 100). These frames 104 may be actual frames received from an application (e.g., a video game application), such as a first frame 104(1) rendered in the past, and a second frame 104(2) rendered in the past after the first frame 104(1). Accordingly, the second frame 104(2) may represent a most recently rendered frame that was received from the application, and the first frame 104(1) and the second frame 104(2) may have been rendered consecutively in a series of frames 104, although the pixel data 108 provided as input at block 302 need not be pixel data 108 for consecutively rendered frames. For instance, an intermediate frame(s) 104 may be rendered between the first frame 104(1) and the second frame 104(2), and the pixel data 108 provided as input at block 302 may pertain to the first frame 104(1) and the second frame 104(2).

At 304, an array of motion vectors 112 may be received from the GPU 110. The array of motion vectors 112 received at block 304 may have been generated by a video encoder of the GPU 110 based at least in part on the first pixel data 108(1) associated with the first frame 104(1) and the second pixel data 108(2) associated with the second frame 104(2)

(e.g., based on a comparison between the first pixel data 108(1) and the second pixel data 108(2)). The video encoder of the GPU 110 may be configured to use a suitable computer vision and/or video encoding algorithm that looks for similarity between pixel values (or groups of pixel values), such as by determining whether a difference between compared pixel values is less than a threshold difference. Anything within such a similarity metric may be considered to be matching pixel data 108 between the two frames 104.

At 306, the logic may generate third pixel data 108(3) for a re-projected frame 104(3) based at least in part on the second pixel data 108(2) of the second frame 104(2). In this case, the second frame 104(2) represents the frame 104 rendered immediately before the re-projected frame 104(3).

At 308, the logic may modify the third pixel data 108(3) based at least in part on the array of motion vectors 112 to obtain modified third pixel data 108(3)' for the re-projected frame 104(3). As shown by sub-blocks 310 and 312, the modification of the pixel data 108(3) for the re-projected frame 104(3) may utilize a render mesh 200.

Accordingly, at 310, the logic may generate a render mesh 200 for the re-projected frame 104(3). The render mesh 200 may comprise a tessellated mesh having a plurality of vertices 202. In some embodiments, the resolution of the render mesh 200 may match a resolution of the array of motion vectors 112 such that there is a one-to-one correspondence between a motion vector 112 and an "element" of the render mesh 200 (e.g., elements such as vertices 202 of the render mesh 200, squares (or quads) of the render mesh 200, etc.). Obtaining a matching resolution between the motion vector field 112 and the render mesh 200 may include any of the techniques described herein, such as requesting that the GPU 110 output the motion vector field 112 at a particular resolution, down-sampling or up-sampling the resolution of the motion vector field 112, and/or generating the render mesh 200 at a resolution that matches the resolution of the motion vector field 112 output by the GPU 110.

At 312, the logic may move vertices 202 (of the plurality of vertices 202) of the render mesh 200 to different locations within the render mesh 200 as moved vertices 206. The vertices 202 may be moved (i) in directions of the non-zero motion vectors 112, and (ii) by amounts corresponding to magnitudes of the non-zero motion vectors 112. Accordingly, the modification of the third pixel data 108(3) at block 308 may be in accordance with the moved vertices 206 of the render mesh 200, such as by moving pixel values of the third pixel data 108(3) in accordance with the move vertices 206 to obtain modified third pixel data 108(3)' of the re-projected frame 104(3). For example, a pixel value of the third pixel data 108(3) might be moved 4 pixels to the left, and 4 pixels upward to a new location within modified third pixel data 108(3)' in accordance with a moved vertex 206 within the render mesh 200.

In some embodiments, multiple motion vector fields 112 may be received at block 304 based on different sets of previously rendered frames 104 input at block 302, and additional motion-related parameters may be determined based on the multiple motion vector fields 112 to use in motion smoothing at block 308 for a re-projected frame. For example, in addition to the previous two frames 104(1) and 104(2), which results in the array of motion vectors 112 received at block 304, the algorithm of FIG. 3 may, in some embodiments, go back one or more additional frames, such as by providing the first frame 104(1) and a "zeroth" frame 104(0) that was rendered prior to the first frame 104(1) as input to the GPU 110 and receiving an additional array of motion vectors 112 based on that different pair of input frames 104. The multiple arrays of motion vectors may then be compared to determine motion-related parameters like acceleration of an object that is moving frame-to-frame, and these motion-related parameters can be applied at block 308, such as by modifying (e.g., increasing/decreasing) the magnitude of a final motion vector 112 that is applied to the third pixel data 108(3) to move a pixel value more or less in terms of the motion-smoothing adjustment.

At 314, the logic may render the re-projected frame 104(3) on a display (e.g., on a display panel(s) of the HMD 100) based at least in part on the modified third pixel data 108(3)'. The resulting re-projected frame 104(3) that is rendered at block 314 is "motion smoothed" by virtue of the modification of the third pixel data 108(3) in accordance with the motion vectors 112 received from the GPU 110. It is to be appreciated that the GPU 110 may represent one or more GPUs 110. For example, multiple GPUs 110 may be utilized to render a given frame 104 on stereo display panels of the HMD 100, and the pixel data 108 of frames 104 input to these GPUs 110 can be partitioned accordingly (e.g., a left half of the pixel data 108 may be provided as input to a first GPU 110 and a right half of the pixel data 108 may be provided as input to a second GPU 110).

Figure 4:
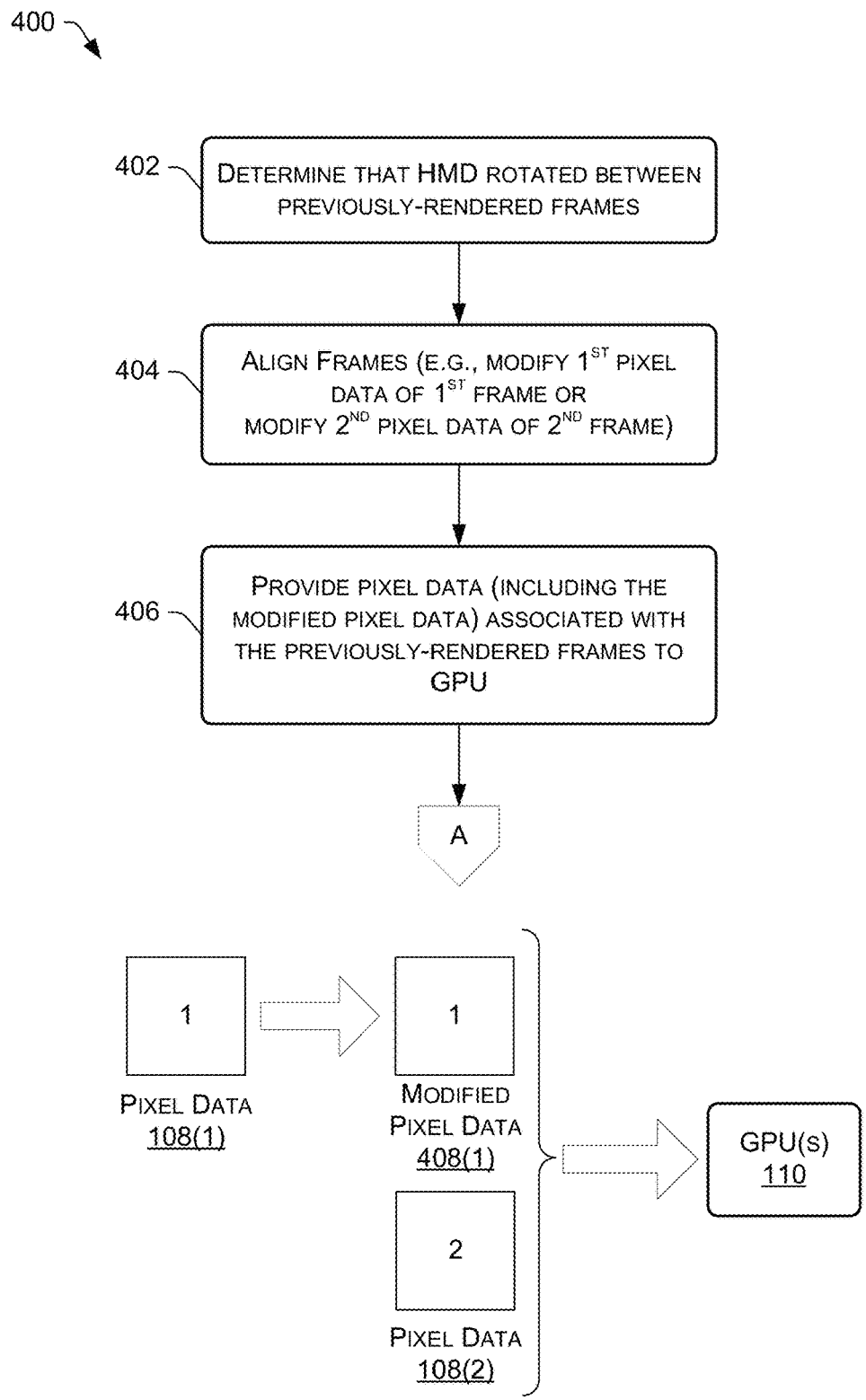
FIG. 4 is a flow diagram of an example process for aligning pixel data of previously-rendered frames before the pixel data is input to a GPU for motion vector estimation, in accordance with embodiments disclosed herein.

FIG. 4 is a flow diagram of an example process 400 for aligning pixel data of previously-rendered frames before the pixel data is input to a GPU for motion vector estimation, in accordance with embodiments disclosed herein. For discussion purposes, the process 400 is described with reference to the previous figures. Furthermore, as shown by the off-page reference "A" in FIGS. 3 and 4, the process 400 may represent operations that are performed prior to the operations at block 304 of FIG. 3, and the process 400 may, in some embodiments, continue with the operations of blocks 304-314.

At 402, logic of a HMD 100 may determine, based on rotation data provided by a head tracking module of the HMD 100, that the HMD 100 has rotated from a first orientation to a second orientation between rendering the previously-rendered frames 104 whose pixel data 108 is to be provided as input to the GPU 110. This is shown in the example of FIG. 1, where the user 102 is shown as having rotated his/her head in a rightward direction between time, t1, and time, t2, which are meant to correspond to the times of rendering the first frame 104(1) and the second frame 104(2). The amount of rotation depicted in FIG. 1 between consecutive frames 104 is exaggerated for purposes of illustration.

At 404, the previously-rendered frames 104 may be aligned before the pixel data 108 for those frames 104 is provided as input to the GPU 110. This is done because of the movement of the HMD 100 between the frames 104, which may have caused objects (both stationary and moving objects) to move between locations over the course of rendering the two frames 104(1) and 104(2). By aligning one frame 104(1) with the other frame 104(2), or vice versa, the pixel data 108 that represents particular static objects within the scene can be moved to generally the same location between the two frames 104(1) and 104(2) so that the pixel data 108 corresponding to static objects is not mistaken for moving objects by the video encoder of the GPU 110. The alignment at block 404 may include modifying at least one of: (i) the first pixel data 108(1) (associated with the first frame 104(1)) to obtain modified first pixel data 408(1) that aligns a scene in the first frame 104(1) with the second orientation of the HMD 100 at a time of rendering the second frame 104(2), or (ii) the second pixel data 108(2) (associated with the second frame 104(2)) to obtain modified second pixel data that aligns a scene in the second frame 104(2) with the first orientation of the HMD 100 at a time of rendering the first frame 104(1). The diagram at the bottom of FIG. 4 shows the former case—where the first pixel data 108(1) is modified to obtain modified first pixel data 408(1) that aligns a scene in the first frame 104(1) with the second orientation of the HMD 100. It is to be appreciated, however, that either the first pixel data 108(1) or the second pixel data 108(2) can be modified for alignment purposes.

At 406, the logic may provide the modified pixel data of one of the previously-rendered frames 104 and the original pixel data 108 of the other frame 104 as input to a GPU 110. The example shown in the diagram of FIG. 4 depicts providing the modified first pixel data 408(1) and the original second pixel data 108(2) as input to the GPU 110. As mentioned, the process 400 may continue from block 406 to block 304 of the process 300 (as shown by the off-page reference "A"). Accordingly, an array of motion vectors 112 may be received from the GPU 110 at block 304 based on the pixel data provided as input to the GPU 110 at block 406, and the remaining operations of the motion smoothing algorithm of FIG. 3 may be performed to render a re-projected frame 104(3) that is motion smoothed.

Figure 5:
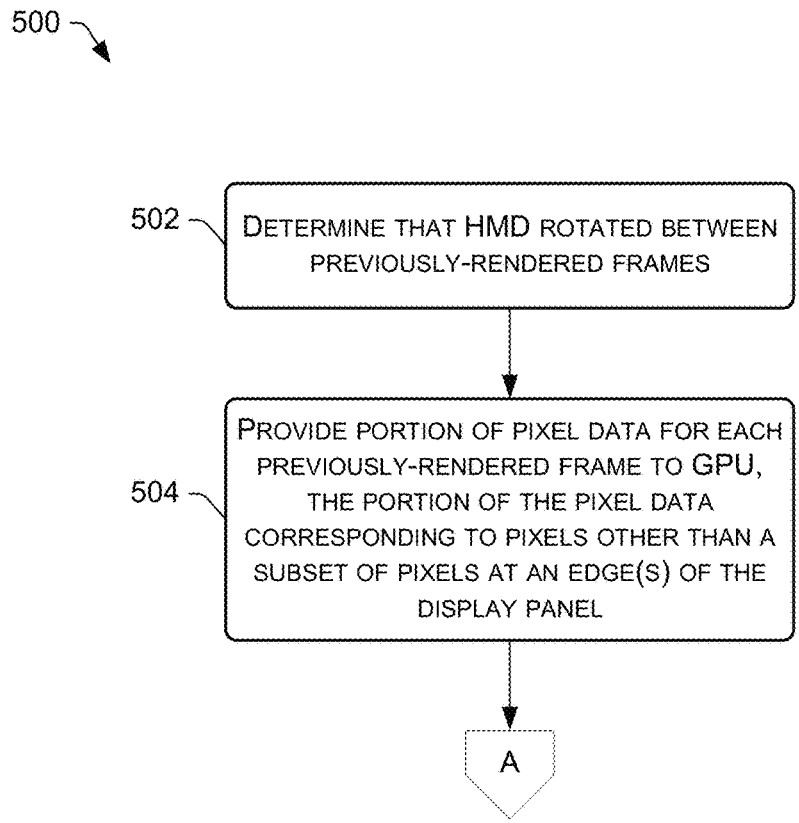
FIG. 5 is a flow diagram of an example process for excluding some pixel data of previously-rendered frames, and providing a remaining portion of the pixel data as input to a GPU for motion vector estimation, in accordance with embodiments disclosed herein.
Figure 5:
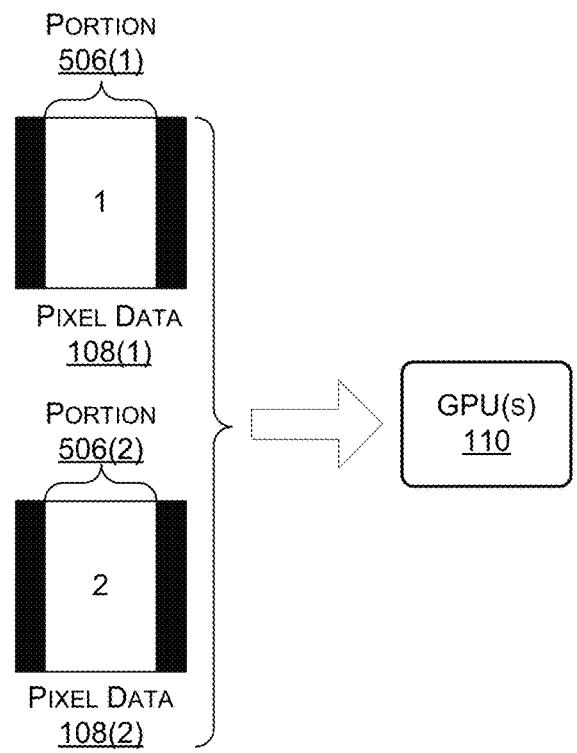

FIG. 5 is a flow diagram of an example process 500 for excluding some pixel data of previously-rendered frames, and providing a remaining portion of the pixel data as input to a GPU for motion vector estimation, in accordance with embodiments disclosed herein. For discussion purposes, the process 500 is described with reference to the previous figures. Furthermore, as shown by the off-page reference "A" in FIGS. 3 and 5, the process 500 may represent operations that are performed prior to the operations at block 304 of FIG. 3, and the process 500 may, in some embodiments, continue with the operations of blocks 304-314.

At 502, logic of a HMD 100 may determine, based on rotation data provided by a head tracking module of the HMD 100, that the HMD 100 has rotated from a first orientation to a second orientation between rendering the previously-rendered frames 104 that are to be provided as input to the GPU 110. The previously-rendered frames 104 may be the first frame 104(1) and the second frame 104(2) shown in FIG. 1.

At 504, the logic may provide a portion of available pixel data 108 as the input to the GPU 110. The portion of the available pixel data 108 provided as input to the GPU 110 may include, for example, a portion 506(1) of the first pixel data 108(1) and a portion 506(2) of the second pixel data 108(2) that each corresponds to pixels other than a subset of pixels at one or more edges of a display panel of the HMD 100. For instance, as shown in FIG. 5, the portions 506 of the pixel data 108 provided as input to the GPU 110 exclude a remaining portion of the pixel data 108 at the left and right edges of the display panel (shown in black in FIG. 5). In other words, the pixel data 108 at the left and right edges of the display panel is not provided to the GPU 110 so that the GPU 110 focuses its motion estimation efforts on the center portions 506 of the pixel data 108 between the left and right edges of the display panel. For HMD 100 rotation in the positive and/or negative vertical direction, the excluded portion of the pixel data 108 may be the top and bottom edges of the image. In any case, excluding a portion of the pixel data 108 at the edge(s) of the image, and exclusively providing a remaining portion 506 of the pixel data 108 to the GPU 110 effectively results in zero motion vectors 112 at the edge(s) of the image, which may be useful in situations where unwanted visual artifacts manifest near edges of the image that could result in outlier motion vectors 112 that are not otherwise characteristic of a moving object 106. As mentioned, the process 500 may continue from block 504 to block 304 of the process 300 where an array of motion vectors 112 is received from the GPU 110 based on the pixel data provided as input to the GPU 110 at block 504, and the motion smoothing algorithm of FIG. 3 may be performed to render a re-projected frame 104(3) that is motion smoothed.

Figure 6:
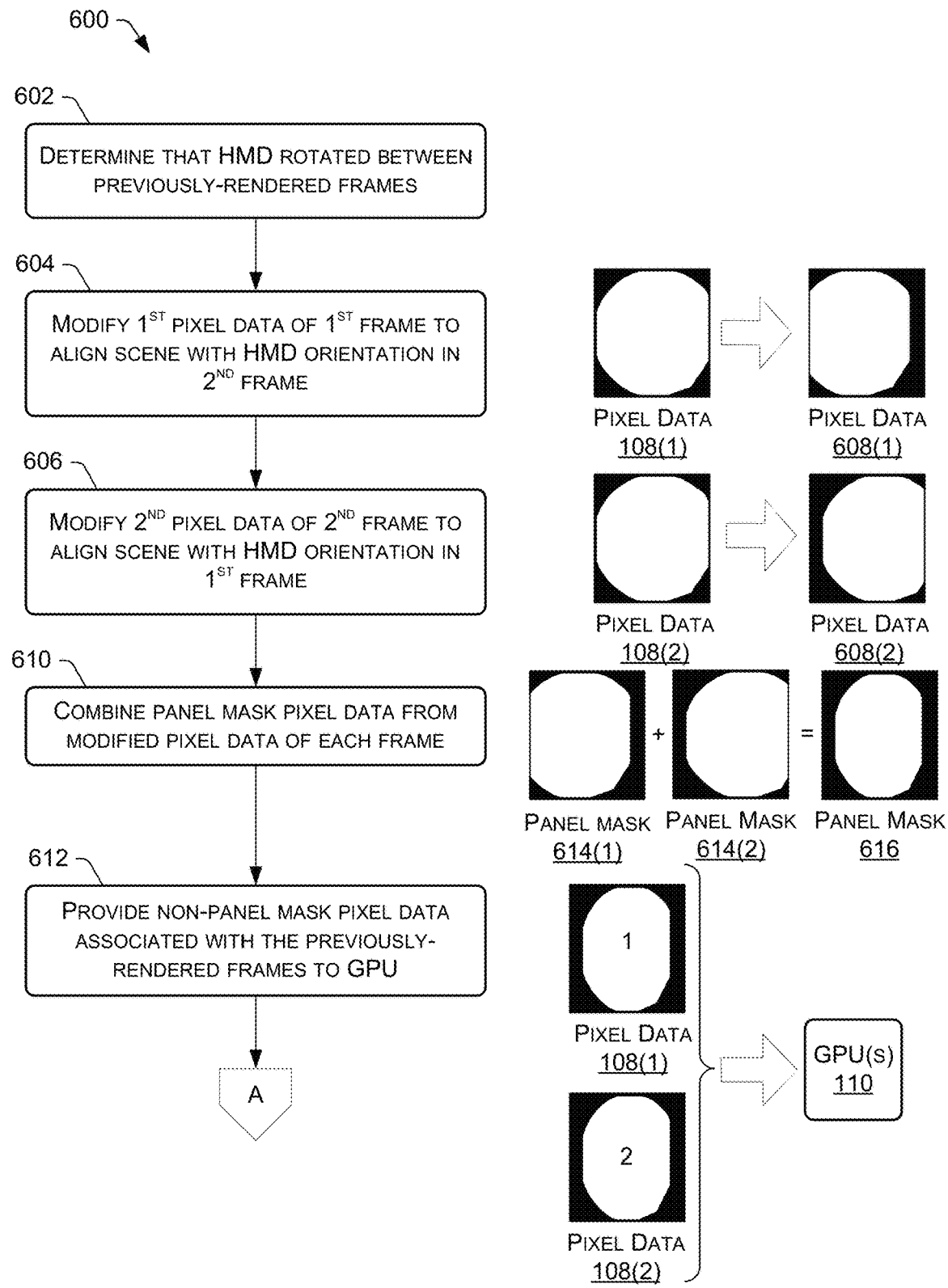
FIG. 6 is a flow diagram of an example process for aligning pixel data of previously-rendered frames, excluding a panel mask portion of the pixel data of the previously-rendered frames, and providing a remaining portion of the pixel data as input to a GPU for motion vector estimation, in accordance with embodiments disclosed herein.

FIG. 6 is a flow diagram of an example process 600 for aligning pixel data of previously-rendered frames, excluding a panel mask portion of the pixel data of the previously-rendered frames, and providing a remaining portion of the pixel data as input to a GPU for motion vector estimation, in accordance with embodiments disclosed herein. For discussion purposes, the process 600 is described with reference to the previous figures. Furthermore, as shown by the off-page reference "A" in FIGS. 3 and 6, the process 600 may represent operations that are performed prior to the operations at block 304 of FIG. 3, and the process 600 may, in some embodiments, continue with the operations of blocks 304-314.

At 602, logic of a HMD 100 may determine, based on rotation data provided by a head tracking module of the HMD 100, that the HMD 100 has rotated from a first orientation to a second orientation between rendering the previously-rendered frames 104 that are to be provided as input to the GPU 110. The previously-rendered frames may be the first frame 104(1) and the second frame 104(2) shown in FIG. 1.

At 604, the logic may modify the first pixel data 108(1) associated with the first frame 104(1) to obtain modified first pixel data 608(1) that aligns a scene in the first frame 104(1) with the second orientation of the HMD 100. In the example of FIG. 6, a portion of the first pixel data 108(1) represents data corresponding to a panel mask (shown in black) rendered at a periphery of a display panel of the HMD 100 with each frame. Accordingly, a panel mask portion 614(1) of the modified first pixel data 608(1) (i.e., the portion shown in black in FIG. 6) represents the data corresponding to the panel mask in the modified first pixel data 608(1).

At 606, the logic may modify the second pixel data 108(2) associated with the second frame 104(2) to obtain modified second pixel data 608(2) that aligns a scene in the second frame with the first orientation of the HMD 100. Again, a portion of the second pixel data 108(2) represents the data corresponding to the panel mask (shown in black) rendered at the periphery of the display panel of the HMD 100 with each frame. Accordingly, a panel mask portion 614(2) of the modified second pixel data 608(2) (i.e., the portion shown in black in FIG. 6) represents the data corresponding to the panel mask in the modified second pixel data 608(2).

At 610, the logic may combine the panel mask portion 614(1) of the modified first pixel data 608(1) with the panel mask portion 614(2) of the modified second pixel data 608(2) to determine a subset of pixels having a common value that corresponds to the panel mask 616. This can be thought of as a Venn diagram of sorts, where the subset of pixels corresponding to the panel mask 616 is a combined version of the modified panel mask in the modified first pixel data 608(1) and the modified second pixel data 608(2).

At 612, the logic may provide, as the input to the GPU 110, a particular portion (e.g., a center portion) of the first pixel data 108(1) and a particular portion (e.g., a center portion) of second pixel data 108(2) that each corresponds to pixels other than the subset of pixels corresponding to the panel mask 616. This allows for the GPU 110 to ignore motion estimations for the portion of the pixel data 108 in each previously-rendered frame that is covered by the panel mask 616 pixels, and the GPU 110 can focus its motion estimation efforts on the center, non-panel mask portions of the pixel data 108 for each frame 104. As mentioned, the process 600 may continue from block 612 to block 304 of the process 300 where an array of motion vectors 112 is received from the GPU 110 based on the pixel data provided as input to the GPU 110 at block 612, and the motion smoothing algorithm of FIG. 3 may be performed to render a re-projected frame 104(3) that is motion smoothed.

Figure 7:
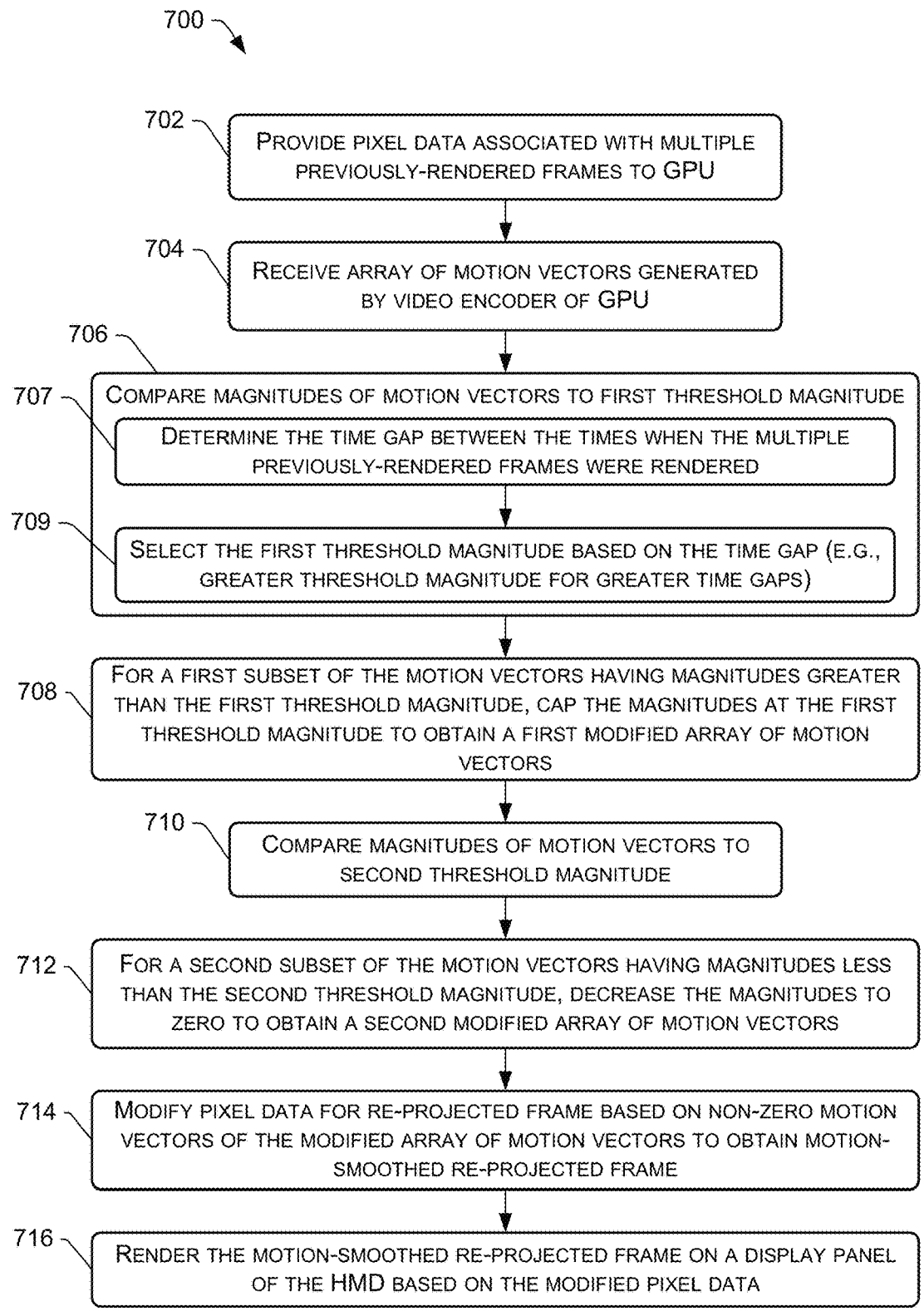
FIG. 7 is a flow diagram of an example process for thresholding the motion vectors that are output from a GPU before they are used to generate a re-projected frame as part of a motion smoothing technique, in accordance with embodiments disclosed herein.

FIG. 7 is a flow diagram of an example process 700 for thresholding the motion vectors that are output from a GPU before they are used to generate a re-projected frame as part of a motion smoothing technique, in accordance with embodiments disclosed herein. For discussion purposes, the process 700 is described with reference to the previous figures.

At 702, logic of a display system (e.g., logic of a HMD 100) may provide pixel data 108 associated with previously-rendered frames 104 as input to a GPU 110. The operation(s) performed at block 702 may be similar to those described with respect to block 302 of the process 300.

At 704, the logic may receive an array of motion vectors 112 from the GPU 110. The operation(s) performed at block 704 may be similar to those described with respect to block 304 of the process 300.

At 706, the logic may compare magnitudes (or lengths) of individual motion vectors in the array of motion vectors 112 to a first threshold magnitude to determine a first subset of motion vectors 112 having magnitudes greater than the first threshold magnitude. The first threshold magnitude may be utilized to mitigate the impact of this subset of high-magnitude outlier motion vectors 112, which may represent changes between frames that are something other than movement or animation of a virtual object 106. Unusually high magnitude motion vectors may occur for various reasons. The GPU 110 may find pixels in the top right of the second frame 104(2) to be similar enough to pixels at the bottom left of the first frame 104(1), and may output a resulting motion vector 112 with a relatively high magnitude compared to other motion vectors 112 in the array, even though this motion vector 112 does not represent movement or animation of a virtual object 106 between the frames 104. In some cases, a video game may allow a user to teleport to a different location where the scenes change drastically between frames 104, causing large motion vectors 112 to be generated by the video encoder of the GPU 110. In these, and other cases, it may be useful to threshold these large motion vectors 112.

At 707, when the multiple previously-rendered frames 104 include a first fame 104(1) and a second frame 104(2), the logic may determine a time period (or gap) between a first time when a first frame 104(1) was rendered and a second time when a second frame 104(2) was rendered.

At 709, the first threshold magnitude used in the comparisons at block 706 may be selected based at least in part on the time period between the first time and the second time. In an illustrative example, the first threshold magnitude, measured in degrees of movement from the user's point of view per unit time, is 6 degrees of movement per 11.1 ms of time between the two frames 104(1) and 104(2). Thus, the longer in time the two frames 104(1) and 104(2) are apart, the greater the first threshold magnitude, and, hence, the longer (in magnitude) the motion vectors 112 are allowed to be. This is because once you have motion past a certain speed, motion smoothing may not be as effective, and may actually cause adverse visual artifacts (e.g., by making parts of the scene look "swimmy").

At 708, the logic may decrease the magnitudes of the first subset of motion vectors 112 determined to have magnitudes greater than the first threshold magnitude so that the magnitudes are capped at the first threshold magnitude. This creates a first modified array of motion vectors 112. In other words, for those motion vectors 112 that exceed the first threshold magnitude, the logic is configured to cap (or limit) the magnitude of those motion vectors 112 to the first threshold magnitude so that the first modified array of motion vectors 112 includes magnitudes that are equal to or less than the first threshold magnitude, and does not include any magnitudes that are greater than the first threshold magnitude. In some embodiments, instead of capping the magnitudes of the motion vectors 112 at a first threshold magnitude and using all of the non-zero motion vectors for motion smoothing, the logic may discard the first subset of motion vectors 112 having magnitudes that meet or exceed the first threshold magnitude so that they are not used in motion smoothing at all.

At 710, the logic may compare magnitudes (or lengths) of individual motion vectors in the array of motion vectors 112 to a second threshold magnitude to determine a second subset of motion vectors 112 having magnitudes less than the second threshold magnitude. The second threshold magnitude may be utilized to mitigate the impact of this subset of low-magnitude outlier motion vectors 112, which may represent changes between frames that are often caused by constant head movement of the user and/or head tracking that, while precise, is not precise to the degree of absolute zero motion. Because of this, the output of the GPU 110 seldom provides zero-length motion vectors 112. Rather, it is more common for the output of the GPU 110 to have a significant amount of noise due to ambient head motion and/or tracking jitter, as noted above. In other words, the pixels between two consecutive frames rarely match up 100%. In an illustrative example, the second threshold magnitude, measured in pixels of motion, is a threshold of 2 pixels of motion. In this example, any motion vectors with magnitudes (or lengths) less than 2 pixels of motion, are considered low-magnitude outlier vectors.

At 712, the logic may decrease the magnitudes of the second subset of motion vectors 112 determined to have magnitudes less than the second threshold magnitude (e.g., the low-magnitude outlier motion vectors with lengths less than 2 pixels of motion) to a length/magnitude of zero. This creates a second modified array of motion vectors 112 that does not include any motion vectors with magnitudes less than the second threshold magnitude. This is sometimes referred to herein as applying a small dead-zone to the motion vectors 112.

At 714, the logic may modify the pixel data 108(3) for the re-projected frame based on the second modified array of motion vectors 112 with magnitudes capped at the first threshold magnitude and without any motion vectors 112 with magnitudes less than the second threshold. In some embodiments, such as when a first subset of motion vectors are discarded instead of being capped at the first threshold magnitude, a remaining subset of motion vectors 112 other than the discarded first subset of motion vectors 112 are used to modify the pixel data 108(3) for the re-projected frame at block 714. The modification of the pixel data 108(3) may include any of the techniques described herein (e.g., those described with reference to block 308-312 of the process 300).

At 716, the logic may render the re-projected frame 104(3) on a display (e.g., on a display panel(s) of the HMD 100) based at least in part on the modified pixel data 108(3) for the re-projected frame 104(3). The operation(s) performed at block 716 may be similar to those described with respect to block 314 of the process 300.

Figure 8:
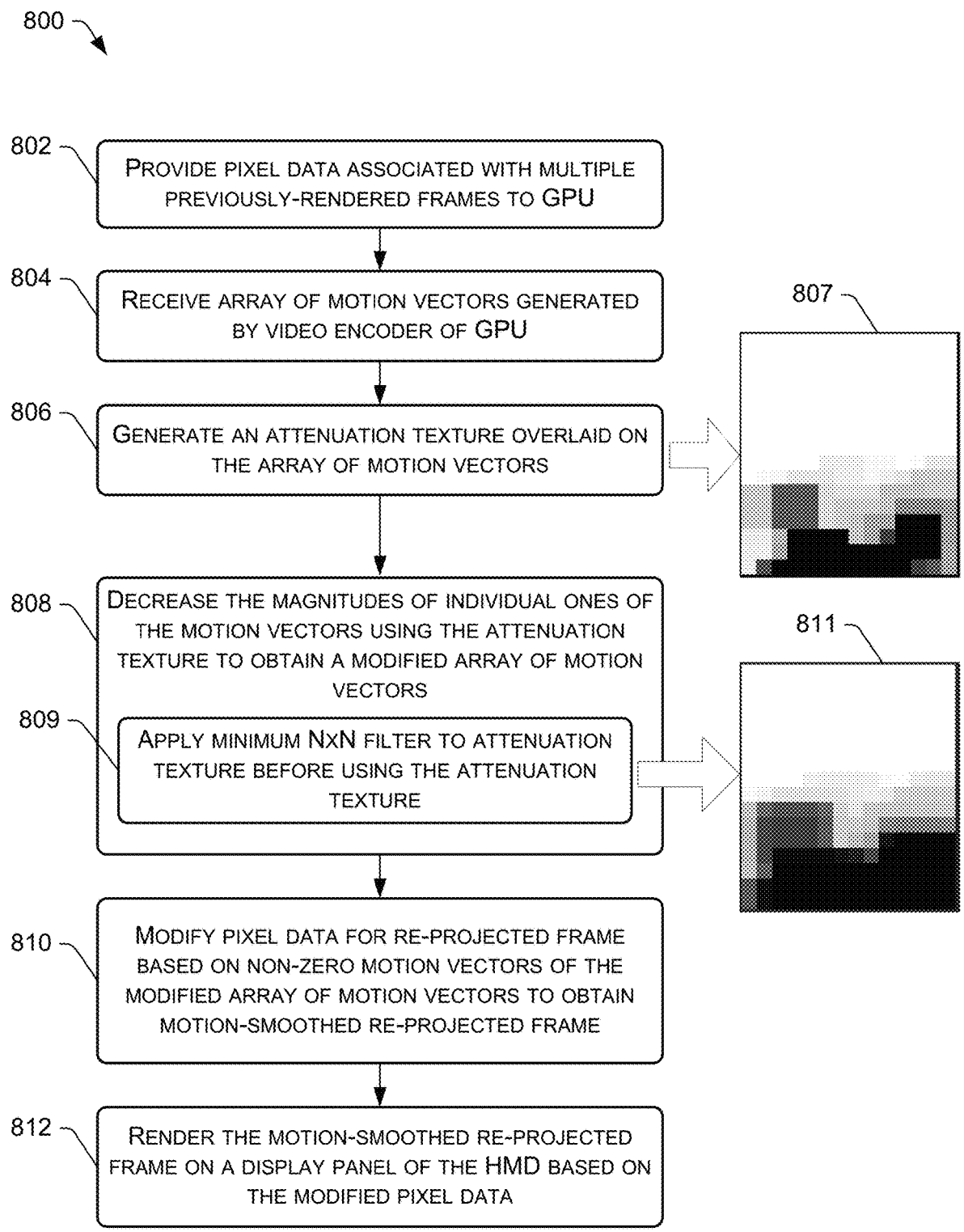
FIG. 8 is a flow diagram of an example process for attenuating the motion vectors that are output from a GPU before they are used to generate a re-projected frame as part of a motion smoothing technique, in accordance with embodiments disclosed herein.

FIG. 8 is a flow diagram of an example process 800 for attenuating the motion vectors that are output from a GPU before they are used to generate a re-projected frame as part of a motion smoothing technique, in accordance with embodiments disclosed herein. For discussion purposes, the process 800 is described with reference to the previous figures.

At 802, logic of a display system (e.g., logic of a HMD 100) may provide pixel data 108 associated with previously-rendered frames 104 as input to a GPU 110. The operation(s) performed at block 802 may be similar to those described with respect to block 302 of the process 300.

At 804, the logic may receive an array of motion vectors 112 from the GPU 110. The operation(s) performed at block 804 may be similar to those described with respect to block 304 of the process 300.

At 806, the logic may generate an attenuation texture overlaid on the array of motion vectors 112 for purposes of attenuating (e.g., shortening, decreasing, etc.) the magnitudes of individual ones of the motion vectors 112 (e.g., if there is a low confidence in the quality of those motion vectors 112). The attenuation texture may be generated at any suitable resolution such that the attenuation texture includes a plurality of texels (e.g., a grid of texels). The resolution of the attenuation texture can be a lower resolution than the resolution of the array of motion vectors 112 such that multiple motion vectors are within an individual texel of the attenuation texture. In an example, the attenuation texture can have a resolution such that a texel in the center of the user's field of view (FOV) is approximately 6 degrees by 6 degrees (horizontally and vertically). The resolution per texel (horizontal and vertical) may be approximate because the number of degrees per texel may not be constant across the attenuation texture. For example, the FOV of the HMD 100 may span roughly 100 degrees by 100 degrees (e.g., plus or minus about 10 degrees) in area. The attenuation texture may be generated based on a non-linear projection matrix so that the resolution varies per texel of the attenuation texture, but the resolution provides texels that are roughly 6-10 degrees×6-10 degrees. Furthermore, each texel of the attenuation texture may be assigned an attenuation value (e.g., within a range of 0.0 and 1.0). The attenuation value assigned to a given texel controls the amount by which the magnitudes of the motion vectors 112 in that texel are decreased (shortened). For example, an attenuation value of 1.0 may correspond to no attenuation, and, hence, applying an attenuation value of 1.0 to a motion vector 112 means that the motion vector 112 is left as-is (e.g., not decreased, shortened, etc.) in terms of its magnitude. An attenuation value of 0.0, however, may correspond to full attenuation, and, hence, applying an attenuation value of 0.0 to a motion vector 112 means that the motion vector 112 is decreased to zero in terms of its magnitude. An attenuation value between 0.0 and 1.0 may correspond to partial attenuation, and, hence, applying an attenuation value of say, 0.5, to a motion vector 112 means that the motion vector is decreased to 50% (half) of its original length (magnitude). Accordingly, the attenuation texture can decrease (shorten) the magnitude of a motion vector 112, but it cannot increase (lengthen) the magnitude of a motion vector 112.

FIG. 8 shows an example attenuation texture 807, which may have been generated at block 808 based on sudden change in luminance (or color) at the bottom of the screen between two consecutively-rendered frames 104. For example, while playing a video game, the user of the HMD 100 may select a button on a handheld controller which causes a large blue mesh to appear at the bottom half of the screen on the next rendered frame 104. In this example scenario, the GPU 110, when processing this frame 104 and a previously-rendered frame 104 as input, may find pixels in the sky that is rendered at the top of the scene with luminance values that best match the luminance values of the pixels in the large blue mesh at the bottom half of the screen. This results in the GPU 110 outputting a motion vector field 112 with motion vectors 112 at the bottom of the scene that are suddenly very large in magnitude, and which do not represent actual motion in the scene. In the example attenuation texture 807, white-colored texels may represent an attenuation value of 1.0, whereas black-colored texels may represent an attenuation value of 0.0, and shades of grey-colored texels represent attenuation values between 0.0 and 1.0, exclusive.

At 808, the logic may decrease (e.g., scale down) the magnitudes of the individual motion vectors in the array of motion vectors 112 using the attenuation texture generated at block 806 (e.g., using the attenuation values of the attenuation texture to decrease the magnitudes of the motion vectors 112 by amounts corresponding to the attenuation values). This creates a modified array of motion vectors 112, assuming at least one attenuation value less than 1.0 in the attenuation texture. The objective is to scale down motion vectors 112 that have changed more than a threshold amount between frames 104, which most likely indicates that these motion vectors 112 don't represent actual motion within the scene and should not be mistaken for representing motion. The attenuation texture is used to find areas of the screen where the motion vectors in those areas are extreme (in terms of their magnitude) in a single frame, which indicates that either the motion vectors can't be trusted to represent actual motion, or, if they do represent actual motion within the scene, such motion is too fast for motion smoothing to have a noticeable impact anyway, and it is preferable to have a zero motion vector than to attempt motion smoothing using those motion vectors. Realistically, whenever you have motion, frame-to-frame, the motion is typically not that much different from the previous frame because the refresh rate of the display is typically on the order of 90 Hz, and it is difficult for anything to move very far in that short of time between frames. Thus, more often than not, these extreme motion vectors 112 attenuated by the attenuation texture do not represent actual motion.

As shown by sub-block 809, in some embodiments, using the attenuation texture at block 808 to decrease the magnitudes of the motion vectors may include applying a minimum N×N filter to the attenuation texture before using the attenuation texture to decrease the magnitudes of the motion vectors. Here, N can be any suitable number. N=3 uses a minimum 3×3 filter (i.e., 3×3 block of texels). Using the example of N=3, in applying the minimum 3×3 filter to the attenuation texture at block 809, the logic may fetch, on a per-texel basis from the attenuation texture 807, the minimum value among the 9 attenuation values in each 3×3 block of texels centered on the corresponding texel (e.g., a block of texels including the corresponding texel and its 8 neighboring texels). Applying this minimum N×N filter at block 809 typically results in zeroing out even more motion vectors 112 because any corresponding texel of the attenuation texture that is assigned a non-zero attenuation value, but that has a neighboring texel assigned an attenuation value of zero, will apply the attenuation value of zero to the corresponding motion vectors of that corresponding texel, thereby decreasing the motion vectors in the corresponding texel to zero, despite the corresponding texel being assigned a non-zero attenuation value in the attenuation texture 807. In other words, motion vectors 112 in a given texel of the attenuation texture are zeroed out if a neighboring texel is assigned an attenuation value of zero, which means that the neighboring texel has lots of high-magnitude motion vectors. FIG. 8 shows an example attenuation texture 811 that is a result of applying a minimum N×N filter to the attenuation texture 807. The resulting attenuation texture 811 includes more black-colored texels than the attenuation texture 807, which means that more motion vectors are zeroed out using the resulting attenuation texture 811.

At 810, the logic may modify the pixel data 108(3) for the re-projected frame based on the modified array of motion vectors 112 with perhaps some of the magnitudes attenuated for attenuation values less than 1.0 in the attenuation texture. The modification of the pixel data 108(3) may include any of the techniques described herein (e.g., those described with reference to block 308-312 of the process 300).

At 812, the logic may render the re-projected frame 104(3) on a display (e.g., on a display panel(s) of the HMD 100) based at least in part on the modified pixel data 108(3) for the re-projected frame 104(3). The operation(s) performed at block 812 may be similar to those described with respect to block 314 of the process 300.

Figure 9:
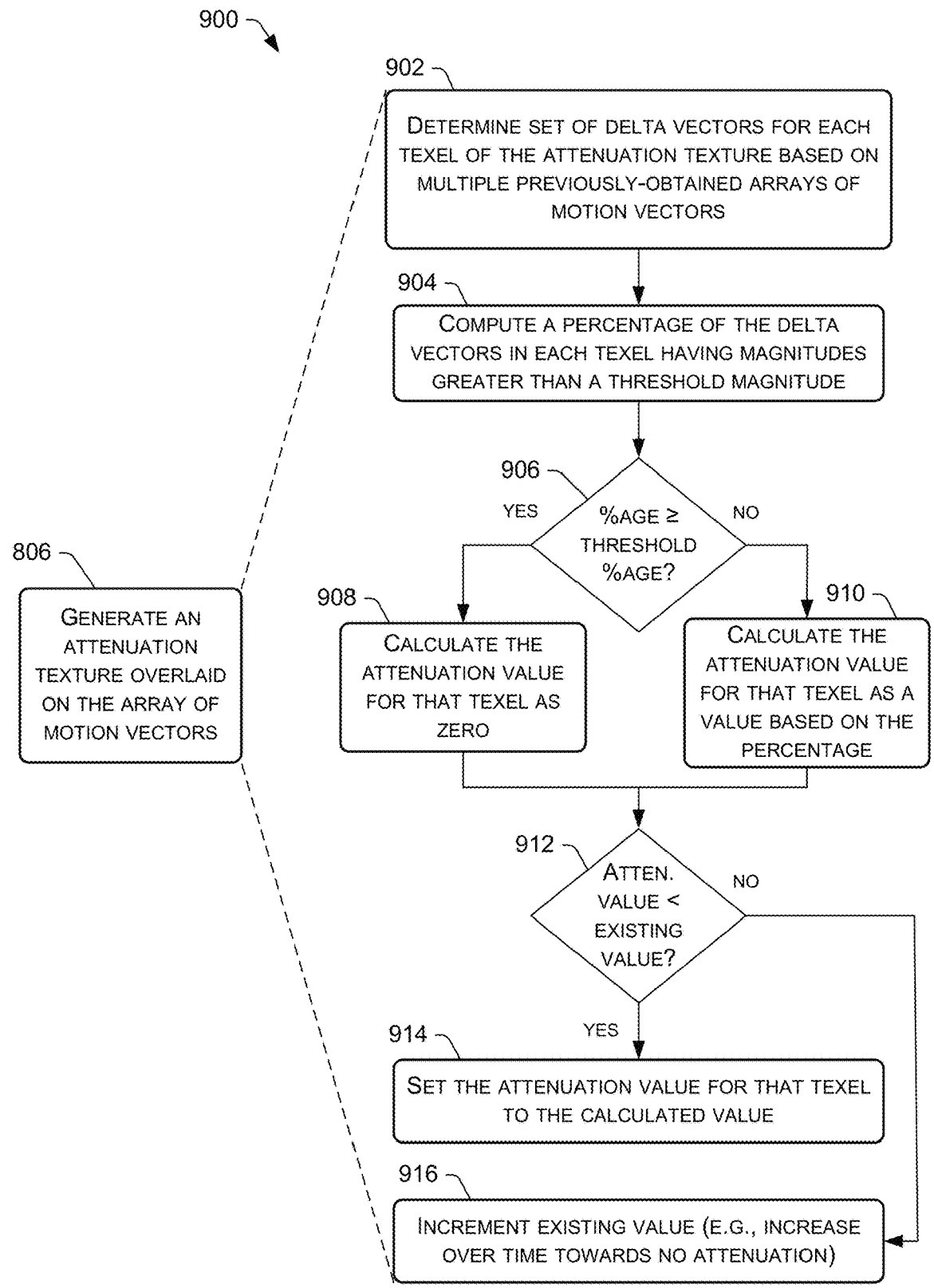
FIG. 9 is a flow diagram of an example process for generating an attenuation texture, which may be used to attenuate the motion vectors that are output from the GPU before they are used to generate a re-projected frame as part of a motion smoothing technique, in accordance with embodiments disclosed herein.

FIG. 9 is a flow diagram of an example process 900 for generating an attenuation texture, such as the attenuation texture described with reference to the process 800 of FIG. 8, in accordance with embodiments disclosed herein. Accordingly, the process 900 may represent a sub-process of operations that may be performed to generate the attenuation texture at block 806 of the process 800. For discussion purposes, the process 900 is described with reference to the previous figures.

At 902, after receiving an array of motion vectors 112 generated by a video encoder of the GPU 110, logic of a display system (e.g., logic of a HMD 100) may determine a set of delta vectors for each texel of the attenuation texture based at least in part on multiple previously-obtained arrays of motion vectors 112. For example, a history of arrays of motion vectors 112 may be maintained as a series of frames are processed, and the last two arrays of motion vectors 112 (e.g., the two most recent arrays of motion vectors 112) may be compared to determine the set of delta vectors at block 902 (e.g., difference vectors that indicate the difference (e.g., in terms of magnitude) between a pair of corresponding motion vectors in the two arrays).

At 904, the logic may compute a percentage of the delta vectors in each texel of the attenuation texture that have a magnitude greater than a threshold magnitude. For example, the logic, at block 904, may evaluate the delta vectors in a given texel of the attenuation texture, identify "outlier" vectors in the texel as those delta vectors having a delta (e.g., magnitude) greater than a threshold magnitude, and compute the percentage of the outlier vectors in the texel. Any suitable threshold can be used for the purpose of identifying "outlier" vectors at block 904, such as a threshold of about 3 degrees of movement/motion (from the user's point of view) per frame (or per 11.1 ms of time). In other words, the threshold used at block 904 may be based on the time period (or gap) between a first time when a first frame 104(1) was rendered and a second time when a second frame 104(2) was rendered, as was described above with reference to blocks 707 and 709 of the process 700 of FIG. 7.

At 906, the logic may determine, for each texel of the attenuation texture, whether the percentage of the delta vectors in the texel that are "outlier" delta vectors meets or exceeds a threshold percentage, such as 25%. If the percentage of the delta vectors in the texel that are "outlier" delta vectors meets or exceeds the threshold percentage at block 906, the process 900 may follow the "YES" route from block 906 to block 908.

At 908, the logic may calculate the attenuation value as zero for the texels that have a number of "outlier" delta vectors that meets or exceeds the threshold percentage. In other words, the logic may calculate the attenuation value for a given texel as zero if a certain amount (e.g., 25% or more) of the delta vectors for that texel are greater than a maximum length. Applying an attenuation value of zero, as described in the process 800, to motion vectors 112 within a given texel decreases the magnitudes of those motion vectors 112 to zero (e.g., to fully attenuate the motion vectors within that texel).

At 906, for texels that have less than the threshold percentage of "outlier" delta vectors, the process 900 may follow the "NO" route from block 906 to block 910, where the logic may calculate the attenuation value for those texels as an attenuation value that is based at least in part on the percentage computed at block 904. For instance, if the percentage of delta vectors having magnitudes greater than the threshold magnitude for a given texel is less than a threshold percentage (e.g., 25%), the attenuation value can be set as a value that maps linearly to the percentage that was computed within a range of values less than the threshold percentage (e.g., within the range of 0%-25%). The attenuation value calculated at block 910 are effective (when the attenuation texture is applied to the motion vector field 112) to reduce noise in the remaining vectors that are not zeroed out.

At 912, the calculated attenuation value may be compared to an existing attenuation value for that texel, based on the previously-rendered frame 104. If the attenuation value is less than the existing value at block 912, the process 900 may follow the "YES" route from block 912 to block 914, where the attenuation value for the texel is set to the attenuation value calculated at block 908 or 910. For instance, if there was no attenuation for that texel of the attenuation texture in the previous frame, the existing attenuation value might be equal to 1.0, and if the new attenuation value calculated at block 908 or 910 is less than 1.0, in this example, the attenuation value is set to that newly calculated attenuation value to attenuate the motion vectors in the given texel.

At 912, if the calculated attenuation value is not less than the existing value for the texel in question, the process 900 may follow the "NO" route from block 912 to block 916, where the existing attenuation value is incremented over time towards a maximum attenuation value (e.g., 1.0) corresponding to no attenuation. For instance, because some situations can cause erratic motion vectors that change from frame to frame, the new attenuation values can be "blended" over the previous (old) attenuation values for the texels of the attenuation texture, which means that the attenuation value incrementally increases over a period of time (e.g., over a period of 1 second) to no attenuation, assuming the calculated attenuation value is never less than the existing attenuation value for the texel over that period of time.

Figure 10:
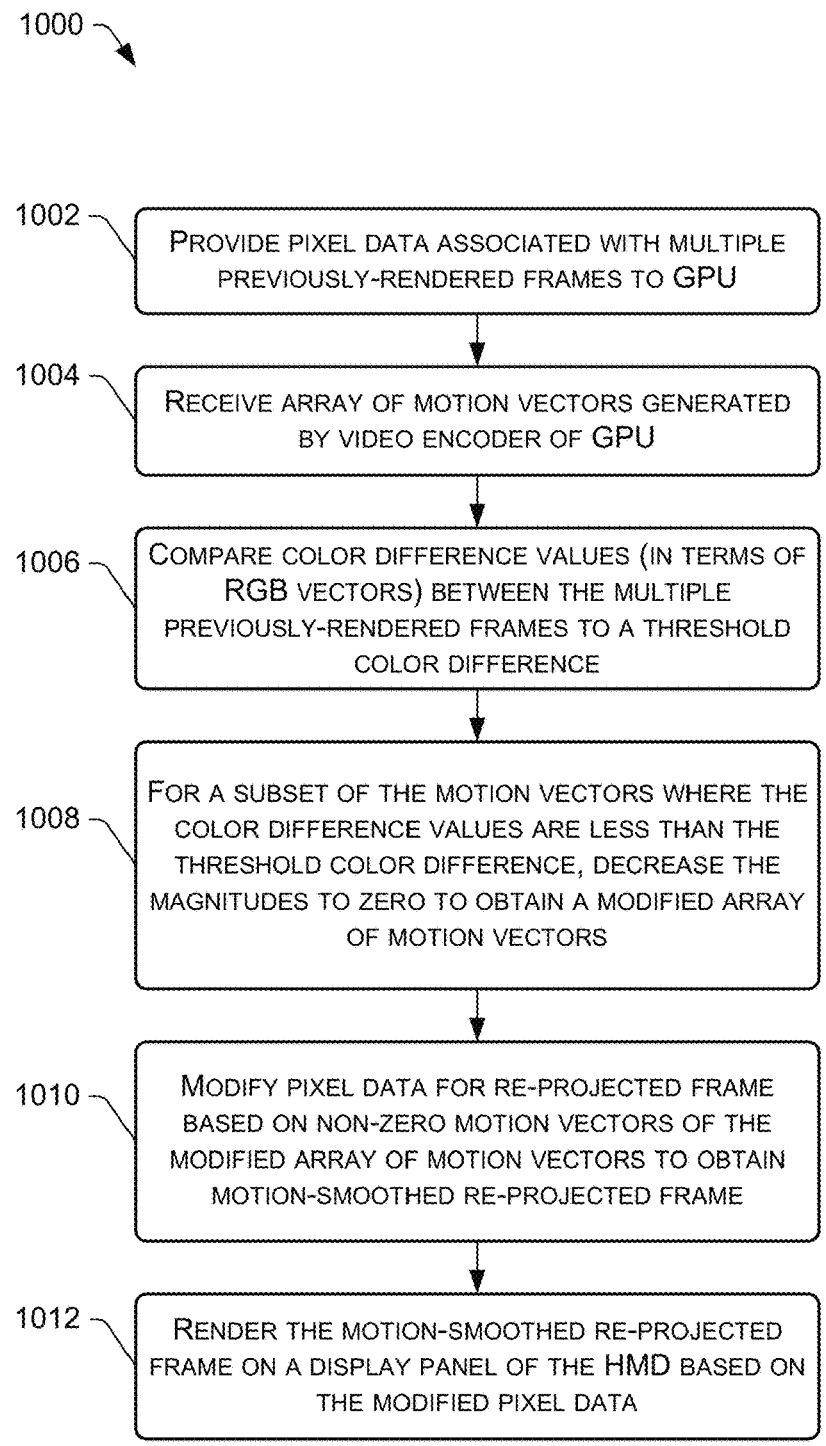
FIG. 10 is a flow diagram of an example process for zeroing out motion vectors that correspond to areas of little-to-no color change before a resulting set of motion vectors is used to generate a re-projected frame as part of a motion smoothing technique, in accordance with embodiments disclosed herein.

FIG. 10 is a flow diagram of an example process 1000 for zeroing out motion vectors that correspond to areas of little-to-no color change before a resulting set of motion vectors is used to generate a re-projected frame as part of a motion smoothing technique, in accordance with embodiments disclosed herein. For discussion purposes, the process 1000 is described with reference to the previous figures.

At 1002, logic of a display system (e.g., logic of a HMD 100) may provide pixel data 108 associated with previously-rendered frames 104 as input to a GPU 110. The operation(s) performed at block 1002 may be similar to those described with respect to block 302 of the process 300.

At 1004, the logic may receive an array of motion vectors 112 from the GPU 110. The operation(s) performed at block 1004 may be similar to those described with respect to block 304 of the process 300.

At 1006, the logic may compare color pixel values (in terms of RGB vectors) between the multiple previously-rendered frames 104 that were input to the GPU 110 to determine a color difference value per motion vector in the array of motion vectors 112. These color difference values can be compared to a threshold color difference to determine a subset of motion vectors 112 that are associated with little-to-no color change between frames because their color difference values are less than the threshold color difference. In some embodiments, the logic treats an RGB pixel value as a vector. The corresponding RGB vectors between the previously-rendered fames 104 are then compared in order to determine a difference (e.g., a delta vector) in color. Because each motion vector 112 in the array of motion vectors 112 may correspond to a block of pixels (e.g., an 8×8 block of pixels), such a color comparison may be performed on a per-motion-vector basis by comparing some or all of the RGB pixel values in an 8×8 block of pixels between frames 104. In some embodiments, the logic compares color values for every other row of pixels and every other column of pixels in each 8×8 block of pixels that corresponds to a single motion vector 112 in order to determine an amount of color change (e.g., a color difference value) between frames 104, the amount of color change being associated with the particular motion vector 112. Thus, with respect to a block of pixels corresponding to a given motion vector 112, the color comparison between frames may involve comparing a portion (e.g., 25%) of the pixels in the corresponding blocks of pixels to conserve processing resources.

At 1008, the logic may decrease, to a length/magnitude of zero, the magnitudes of the subset of motion vectors 112 where the color difference values are less than the threshold color difference. This creates a modified array of motion vectors 112 that does not include any motion vectors in areas of the scene where there was little-to-no color change between the previously-rendered frames (sometimes referred to as zero motion color differences). This can help prevent text from looking blurry or squiggly around the edges when the text is in front of a solid-colored background, for example. It also can help prevent visually-distracting artifacts from appearing whenever lights or other user interface elements in the scene gradually become brighter or dimmer.

At 1010, the logic may modify the pixel data 108(3) for the re-projected frame based on the modified array of motion vectors 112, which no longer includes any motion vectors 112 in areas where the color is effectively the same between the previously-rendered frames 104. The modification of the pixel data 108(3) may include any of the techniques described herein (e.g., those described with reference to block 308-312 of the process 300).

At 1012, the logic may render the re-projected frame 104(3) on a display (e.g., on a display panel(s) of the HMD 100) based at least in part on the modified pixel data 108(3) for the re-projected frame 104(3). The operation(s) performed at block 1012 may be similar to those described with respect to block 314 of the process 300.

Figure 11:
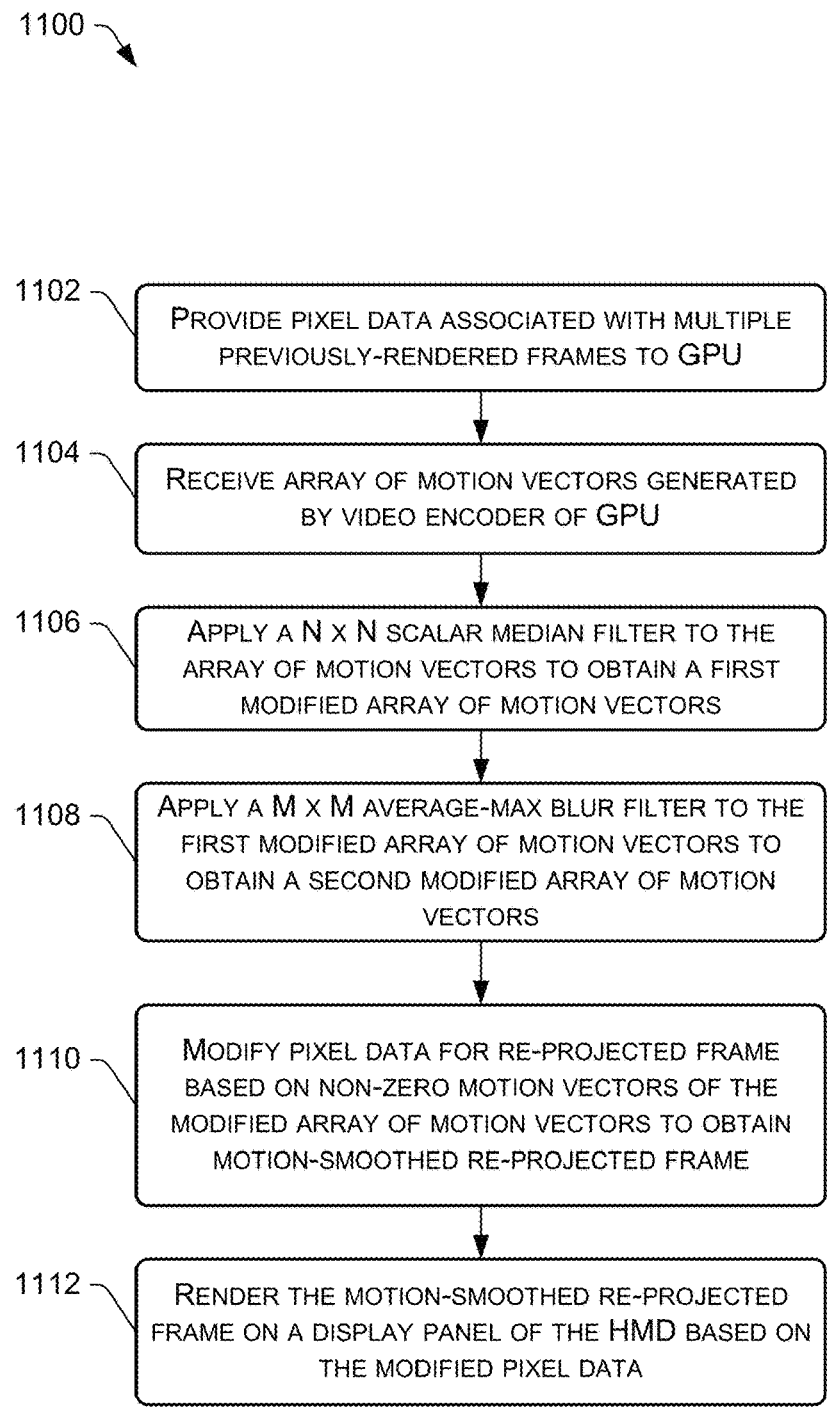
FIG. 11 is a flow diagram of an example process 1100 for "cleaning up" the motion vector field using one or more filters before a resulting set of motion vectors is used to generate a re-projected frame as part of a motion smoothing technique, in accordance with embodiments disclosed herein.

FIG. 11 is a flow diagram of an example process 1100 for "cleaning up" the motion vector field using one or more filters before a resulting set of motion vectors is used to generate a re-projected frame as part of a motion smoothing technique, in accordance with embodiments disclosed herein. For discussion purposes, the process 1100 is described with reference to the previous figures.

At 1102, logic of a display system (e.g., logic of a HMD 100) may provide pixel data 108 associated with previously-rendered frames 104 as input to a GPU 110. The operation(s) performed at block 1102 may be similar to those described with respect to block 302 of the process 300.

At 1104, the logic may receive an array of motion vectors 112 from the GPU 110. The operation(s) performed at block 1104 may be similar to those described with respect to block 304 of the process 300.

At 1106, the logic may apply a N×N scalar median filter to the array of motion vectors 112 to obtain a first modified array of motion vectors 112. Here, N can be any suitable number, such as N=5, which would apply a 5×5 scalar median filter. In the example with N=5, the 5×5 scalar median filter is applied to each motion vector in the array of motion vectors 112 by looking at the 5×5 set of motion vectors 112 surrounding the selected motion vector. For a selected motion vector, the 5×5 area surrounding the selected vector has 25 motion vectors. The scalar median filter applied to the selected motion vector calculates the median x-component value (among the 25 x-component values), and the median y-component value (among the 25 y-component values), and then combines the median x-component value and the median y-component value to obtain the scalar median vector, and the selected motion vector may be replaced with the scalar median vector. This process iterates for each vector in the array of motion vectors 112. Again, any suitable value for N can be used, and N=5 is merely an example. Applying the scalar median filter at block 1106 reduces noise in the motion vector field 112 and helps remove outlier motion vectors. Using a scalar median filter at block 1106 is also computationally faster than applying more complex filters, such as a vector median filter, which would rely on a more complex distance algorithm that is more computationally intensive.

At 1108, the logic may apply a M×M average-max blur filter to the first modified array of motion vectors 112 to obtain a second modified array of motion vectors 112. Here, M can be any suitable number, such as M=3, which would apply a 3×3 average-max blur filter. The average-max blur filter applies two separate filters independently (an average vector filter and a max-length vector filter), and then takes the vector average of the resulting vectors from those two independently-applied filters. In the example using M=3, the 3×3 average-max blur filter is applied to each motion vector in the array of motion vectors 112 by looking at the 3×3 set of motion vectors 112 surrounding the selected motion vector. For a selected motion vector, the 3×3 area surrounding the selected vector has 9 motion vectors. First, an average vector filter is applied to the selected motion vector, which calculates the average x-component value (among the 9 x-component values), and the average y-component value (among the 9 y-component values), and then combines the average x-component value and the average y-component value to obtain the average vector. Next, a max-length vector filter is independently applied to the selected motion vector, which determines the longest vector (among the 9 motion vectors). A resulting vector is then determined by taking the vector average of the average vector and the longest vector, and the selected motion vector may be replaced with the resulting vector. This process iterates for each vector in the array of motion vectors 112. Again, any suitable value for M can be used, and M=3 is merely an example. Applying the average-max blur filter at block 1108 provides a smoothed-out motion vector field that removes discontinuities in sub-areas of groups of motion vectors. In some embodiments, applying the average-max blur filter at block 1108 is a final "cleanup" step on the motion vector field 112 before the motion vector field 112 is used for motion smoothing, as described herein. For instance, if used in combination with the other techniques described herein, such as thresholding motion vectors, using the attenuation texture, zeroing out vectors in areas of little-to-no color difference, etc., these various operations may be performed prior to applying the average-max blur filter.

At 1110, the logic may modify the pixel data 108(3) for the re-projected frame based on the modified array of motion vectors 112 with the filtered motion vectors. The modification of the pixel data 108(3) may include any of the techniques described herein (e.g., those described with reference to block 308-312 of the process 300).

At 1112, the logic may render the re-projected frame 104(3) on a display (e.g., on a display panel(s) of the HMD 100) based at least in part on the modified pixel data 108(3) for the re-projected frame 104(3). The operation(s) performed at block 1112 may be similar to those described with respect to block 314 of the process 300.

It is to be appreciated that the various techniques described in the processes of FIGS. 7-11 (various techniques to modify the motion vector field output by the GPU 110) can be used in any combination and/or any order. For example, the techniques described with reference to FIG. 7 can be used in combination with the techniques described with reference to FIGS. 8 and 9, and some or all of those techniques can be used in combination with the techniques described with reference to FIG. 10, and some or all of those techniques can be used in combination with the techniques described with reference to FIG. 11. That is to say, a robust technique of obtaining an optimized motion vector field may utilize all of the techniques described with reference to FIGS. 7-11 together in a robust modification of the motion vector field.

Figure 12:
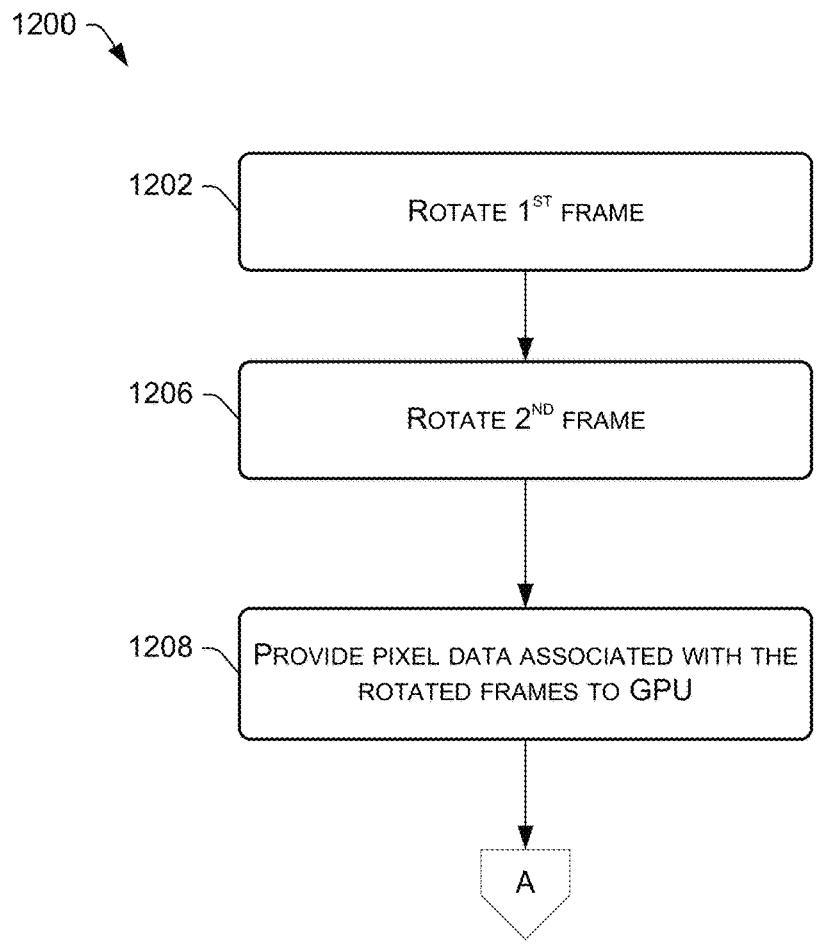
FIG. 12 is a flow diagram of an example process for rotating previously-rendered frames before the pixel data is input to a GPU for motion vector estimation, in accordance with embodiments disclosed herein.
Figure 12:
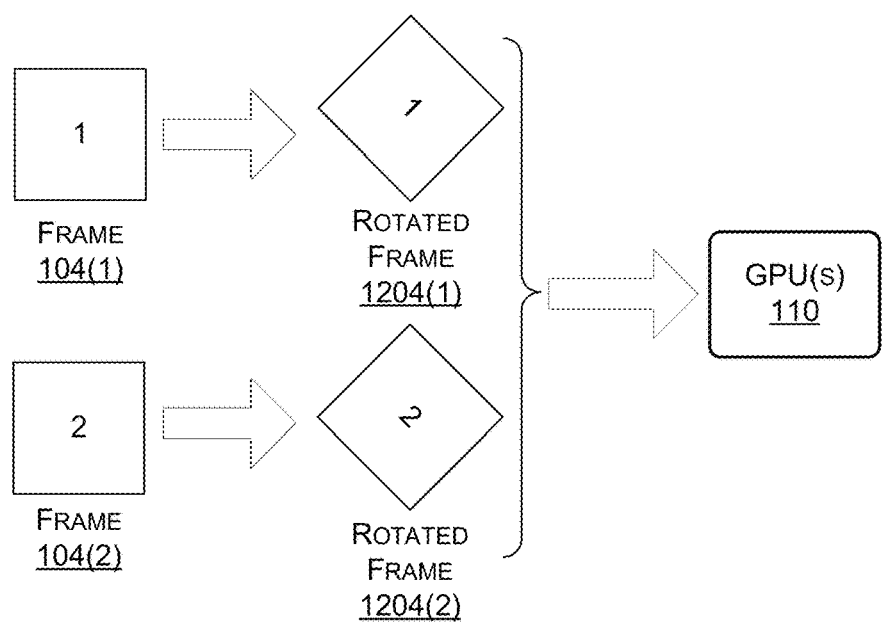

FIG. 12 is a flow diagram of an example process 1200 for rotating previously-rendered frames before the pixel data is input to a GPU for motion vector estimation, in accordance with embodiments disclosed herein. For discussion purposes, the process 1200 is described with reference to the previous figures.

At 1202, logic of a display system (e.g., logic of a HMD 100) may rotate a first frame 104(1), of multiple previously-rendered frames 104 whose pixel data 108 is to be provided as input to the GPU 110, by an amount of rotation to obtain a first rotated frame 1204(1).

At 1206, the logic may rotate a second frame 104(2), of the multiple previously-rendered frames 104, by an amount of rotation to obtain a second rotated frame 1204(2).

At 1208, the logic may provide pixel data of the rotated frames 1204(1) and 1204(2) as input to a GPU 110. The process 1200 may continue from block 1208 to block 304 of the process 300 (as shown by the off-page reference "A"). Accordingly, an array of motion vectors 112 may be received from the GPU 110 at block 304 based on the pixel data provided as input to the GPU 110 at block 1208, and the remaining operations of the motion smoothing algorithm of FIG. 3 may be performed to render a re-projected frame 104(3) that is motion smoothed.

The process 1200 may mitigate the effect of horizontal and/or vertical architectural edges in a scene from causing "strange" motion vectors that are not truly representative of a moving or animating object. The multiple previously-rendered frames 104(1) and 104(2) may be rotated at blocks 1202 and 1206 by the same amount of rotation, or, each frame 104(1) and 104(2) may be rotated by different amounts of rotation at blocks 1202 and 1206, respectively. In some embodiments, the amount of rotation of each frame at blocks 1202 and 1206 is predefined (e.g., rotate the input frames 104(1) and 104(2) by 45 degrees). Rotating the frames 104(1) and 104(2) by 45 degrees may cause the horizontal and vertical edges in a scene to be oriented diagonally, and, as a result, these diagonal edges may not cause as many "strange" motion vectors to be generated by the video encoder of the GPU 110. In some embodiments, the amount of rotation of each frame at blocks 1202 and 1206 may be a random amount of rotation for each frame 104. This may temporally hide any edges that may align with 45 degrees.

Figure 13:
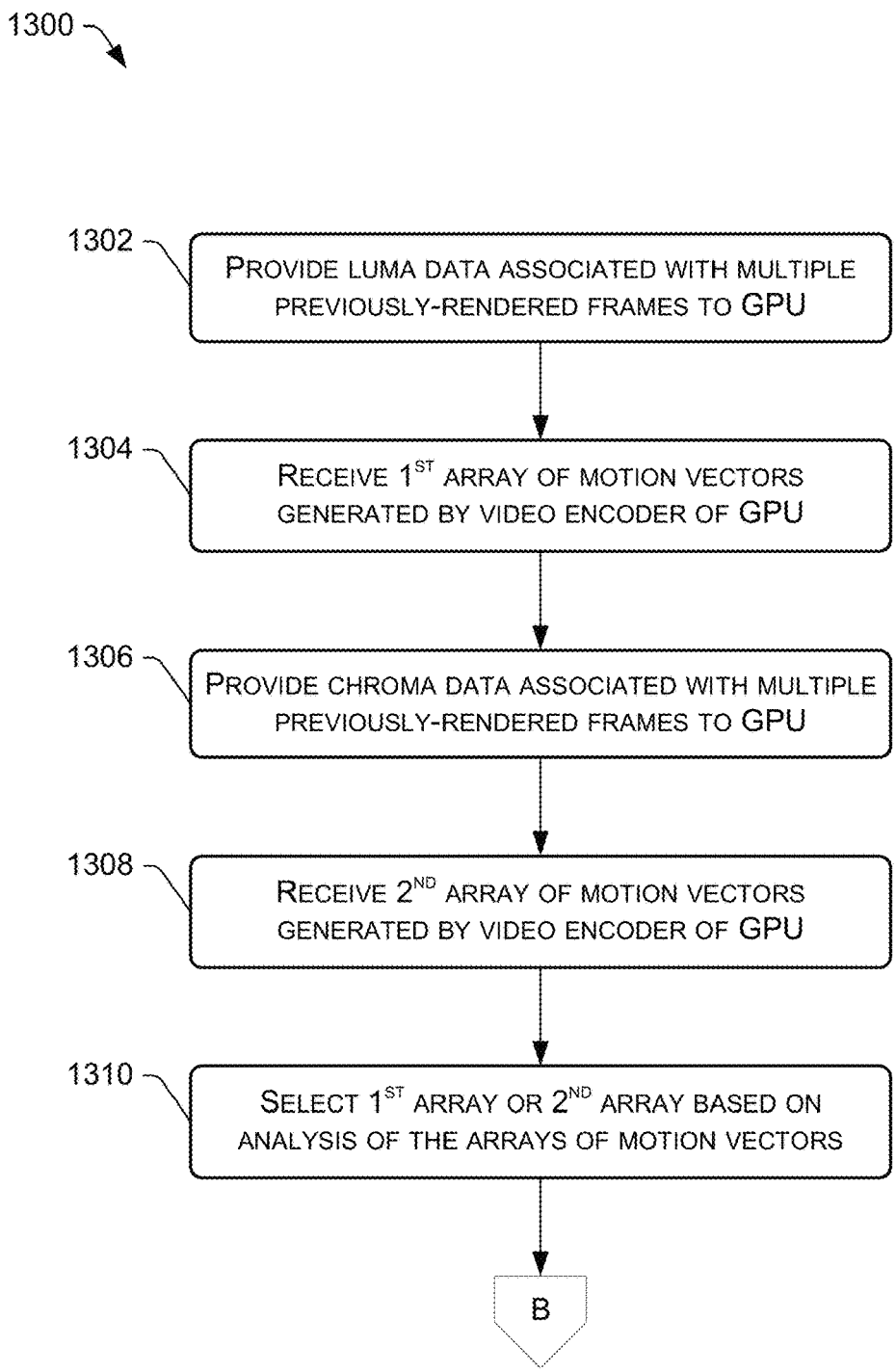
FIG. 13 is a flow diagram of an example process for selecting between arrays of motion vectors that are generated based on luma data and chroma data of previously-rendered frames, in accordance with embodiments disclosed herein.

FIG. 13 is a flow diagram of an example process 1300 for selecting between arrays of motion vectors that are generated based on luma data and chroma data of previously-rendered frames, in accordance with embodiments disclosed herein. For discussion purposes, the process 1300 is described with reference to the previous figures. Furthermore, as shown by the off-page reference "B" in FIGS. 3 and 13, the process 1300 may represent operations that are performed prior to the operations at block 306 of FIG. 3, and the process 1300 may, in some embodiments, continue with the operations of blocks 306-314.

At 1302, logic of a display system (e.g., logic of a HMD 100) may provide luma data associated with previously-rendered frames 104 as input to a GPU 110. For example, first pixel data 108(1) associated with a first frame 104(1) may include first luma data, first chroma data, and/or additional types of data. Similarly, second pixel data 108(2) associated with the second frame 104(2) may include similar types of data, such as second luma data, second chroma data, and so on. Accordingly, the first luma data and the second luma data may be provided as input to the GPU 110 at block 1302.

At 1304, the logic may receive, from the GPU 110, a first array of motion vectors 112 generated by the video encoder of the GPU 110 based at least in part on the first luma data and the second luma data.

At 1306, the logic may provide first chroma data associated with the first frame 104(1) and second chroma data associated with the second frame 104(2) as input to the GPU 110.

At 1308, the logic may receive, from the GPU 110, a second array of motion vectors 112 generated by the video encoder of the GPU 110 based at least in part on the first chroma data and the second chroma data.

At 1310, the logic may select one of the first array of motion vectors 112 or the second array of motion vectors 112 as a selected array of motion vectors based on an analysis of the first array of motion vectors 112 and the second array of motion vectors 112. For instance, a selection algorithm may be based on the magnitudes and/or the directions of the motion vectors 112 in each field of motion vectors 112 to select one that is the least erratic, as an example. For instance, when bright flashing light (e.g., a virtual explosion) occurs in the second frame 104(2), the luma data may cause the GPU 110 to output motion vectors 112 with magnitudes exceeding some threshold magnitude, whereas the chroma data for the same previously-rendered frames 104 may cause the GPU 110 to output motion vectors 112 that do not include such motion vectors with extremely large magnitudes. In this case, the array of motion vectors 112 generated from the chroma data may be selected at block 1310. This is merely one example of a selection algorithm, and others may be employed. As mentioned, the process 1300 may continue from block 1310 to block 306 of the process 300 where pixel data 108(3) for a re-projected frame 104(3) is modified based on the selected array of motion vectors 112 from block 1310.

Figure 14:
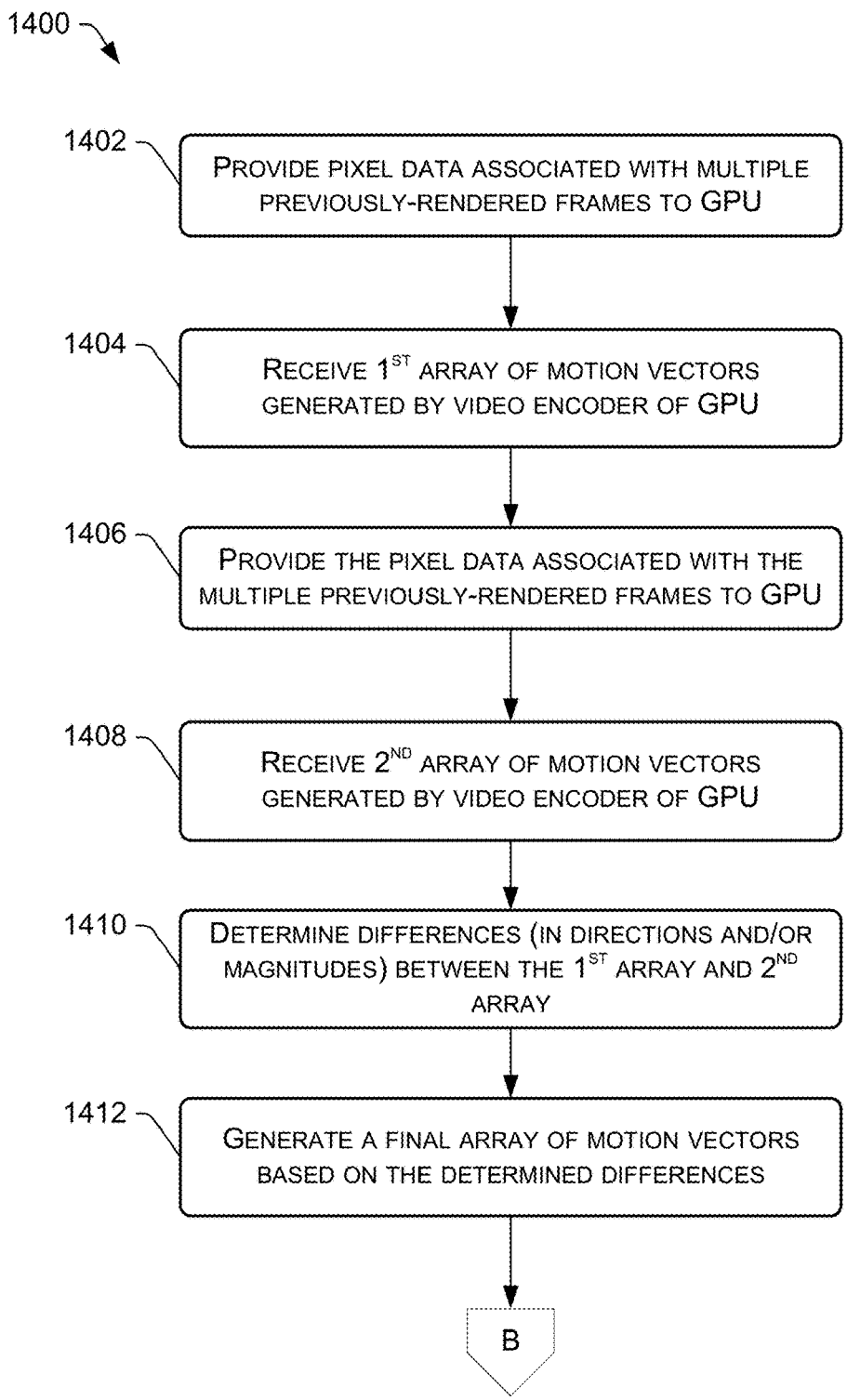
FIG. 14 is a flow diagram of an example process for obtaining multiple arrays of motion vectors, determining differences between the arrays, and generating a final array of motion vectors based on the determined differences for motion smoothing, in accordance with embodiments disclosed herein.

FIG. 14 is a flow diagram of an example process 1400 for obtaining multiple arrays of motion vectors, determining differences between the arrays, and generating a final array of motion vectors based on the determined differences for motion smoothing, in accordance with embodiments disclosed herein. For discussion purposes, the process 1400 is described with reference to the previous figures. Furthermore, as shown by the off-page reference "B" in FIGS. 3 and 14, the process 1400 may represent operations that are performed prior to the operations at block 306 of FIG. 3, and the process 1400 may, in some embodiments, continue with the operations of blocks 306-314.

At 1402, logic of a display system (e.g., logic of a HMD 100) may provide first pixel data 108(1) associated with previously-rendered frames 104 as input to a GPU 110. The operation(s) performed at block 1402 may be similar to those described with respect to block 302 of the process 300.

At 1404, the logic may receive a first array of motion vectors 112(1) from the GPU 110 based on the first pixel data 108(1) provided as input at block 1402.

At 1406, the logic may provide second pixel data 108 associated with previously-rendered frames 104 as input to a GPU 110.

At 1408, the logic may receive, from the GPU 110, and based at least in part on the second pixel data 108(2), a second array of motion vectors 112(2).

At 1410, the logic may determine differences in directions and/or magnitudes of motion vectors 112 between the first array 112(1) and the second array 112(2). For example, a comparison can be made between a motion vector 112 in the first array 112(1) and a corresponding motion vector 112 in the second array 112(2) to determine if the motion vectors are different in terms of either or both of direction or magnitude of the motion vectors, and if so, an amount by which they are different.

At 1412, the logic may generate a final array of motion vectors 112 based at least in part on the differences between the first array of motion vectors 112(1), or the second array of motion vectors 112(2), as determined at block 1410. For example, the final array of motion vectors 112 may represent a set of motion vectors that results from attenuating individual ones of the motion vectors in the first array 112(1) or the second array 112(2), or from attenuating averaged motion vectors that represent averages of the corresponding motion vectors in each array 112(1) and 112(2). As mentioned, the process 1400 may continue from block 1412 to block 306 of the process 300 where pixel data 108(3) for a re-projected frame 104(3) is modified based on the final array of motion vectors 112 generated at block 1412.

As an illustrative example of how the process 1400 can be used, consider an example where the first array of motion vectors 112(1) is received at block 1404 based on pixel data 108 of input frames 104(1) and 104(2) in their original ("y-up") orientation, and the second array of motion vectors 112(2) is received at block 1408 based on pixel data 108 of input frames 104(1) and 104(2) that have been rotated 45 degrees. This concept of rotating the input image frames 104 was described with reference to FIG. 10. Thus, in this illustrative example, pixel data 108 for the first frame 104(1) and the second frame 104(2) may be provided as input at block 1402 to generate the first array of motion vectors 112(1), and pixel data 108 for the first rotated frame 1004(1) and the second rotated frame 1004(2) may be provided as input at block 1406 to generate the second array of motion vectors 112(2). In this illustrative example, the two arrays of motion vectors 112(1) and 112(2) may be realigned (e.g., by rotating the second array 112(2) by 45 degrees in the reverse direction) and then compared to determine mismatches by looking at the angular differences (direction) and/or length differences (magnitude) between the corresponding vectors in both arrays 112(1) and 112(2). It may be the case that actual motion (e.g., moving or animating objects in the scene) may generate very similar arrays of motion vectors for the rotated input frames 104, while incorrectly detected motion may generate very different arrays of motion vectors. In this illustrative example, the final array of motion vectors 112 can be generated at block 1412 by attenuating the length of the average of two corresponding vectors in each array 112(1) and 112(2) by the dot product of the two normalized vectors. In some embodiments, an attenuation texture, like the one described with reference to FIGS. 8 and 9, may be utilized at block 1412 to generate the final array. For instance, the set of delta vectors determined at block 902 of the process 900 may be based on deltas between the first array of motion vectors 112(1) received at block 1404 and the second array of motion vectors 112(2) received at block 1408, and the resulting attenuation texture may be used at block 1412 to attenuate the first array 112(1), the second array 112(2), or a combination (e.g., average) of vectors between the two arrays 112(1) and 112(2).

As another illustrative example of how the process 1400 can be used, consider an example where a first mip level (mipmap level) is generated for the input textures of the multiple previously-rendered frames 104, and the corresponding pixel data 108 for this first mip level is provided as input to the GPU 110 at block 1402 to generate the first array of motion vectors 112(1). Meanwhile, a second mip level may be generated for the input textures of the multiple previously-rendered frames 104, and the corresponding pixel data 108 for this second mip level may be provided as input to the GPU 110 at block 1406 to generate the second array of motion vectors 112(2). This can even be done for any number of mip levels to generate any number of corresponding arrays of motion vectors. In some embodiments, 3 or 4 mip levels of the input textures can be generated so that 3 or 4 arrays of motion vectors 112 are received prior to block 1410. In some embodiments, each mip level is half the width and height of the previous mip level (e.g., 25% of the area). At block 1410, in this illustrative example, differences between pairs of arrays 112 generated from different mip levels may be determined, and, at block 1412, a final array of motion vectors 112 may be generated based on the determined differences. For instance, the logic may detect anomalies across the multiple arrays of motion vectors 112 for different mip levels, and the anomalous motion vectors can be attenuated (e.g., decreased to zero). This example of using different mip levels of the input frames 104 to generate different arrays of motion vectors 112 may help in situations where there is a large area of a repeating pattern (e.g., wallpaper) in a scene, and where the video encoder of the GPU 110 might otherwise generate lots of high magnitude motion vectors thinking that there is lots of motion due to the frequency of the repeating pattern relative to the motion vector resolution, even though there are no moving or animating objects. Accordingly, the process 1400, when used to generate arrays of motion vectors 112 for different mip levels, may help detect anomalies across different frequencies of the repeating pattern, and, when detected, an attenuation texture can be used to attenuate (e.g., zero out) those motion vectors 112.

As yet another example of how the process 1400 can be used, consider an example where the multiple arrays 112(1) and 112(2) are obtained at different resolutions, and the differences are determined at block 1410 by comparing a single motion vector in the first array 112(1) to multiple corresponding motion vectors in the second array 112(2) (e.g., to an average, in terms of direction and/or magnitude, of the multiple corresponding motion vectors in the second array 112(2)). Using arrays of motion vectors 112 at different resolutions may yield differences that are useful for generating a final array of motion vectors at block 1412.

Figure 15:
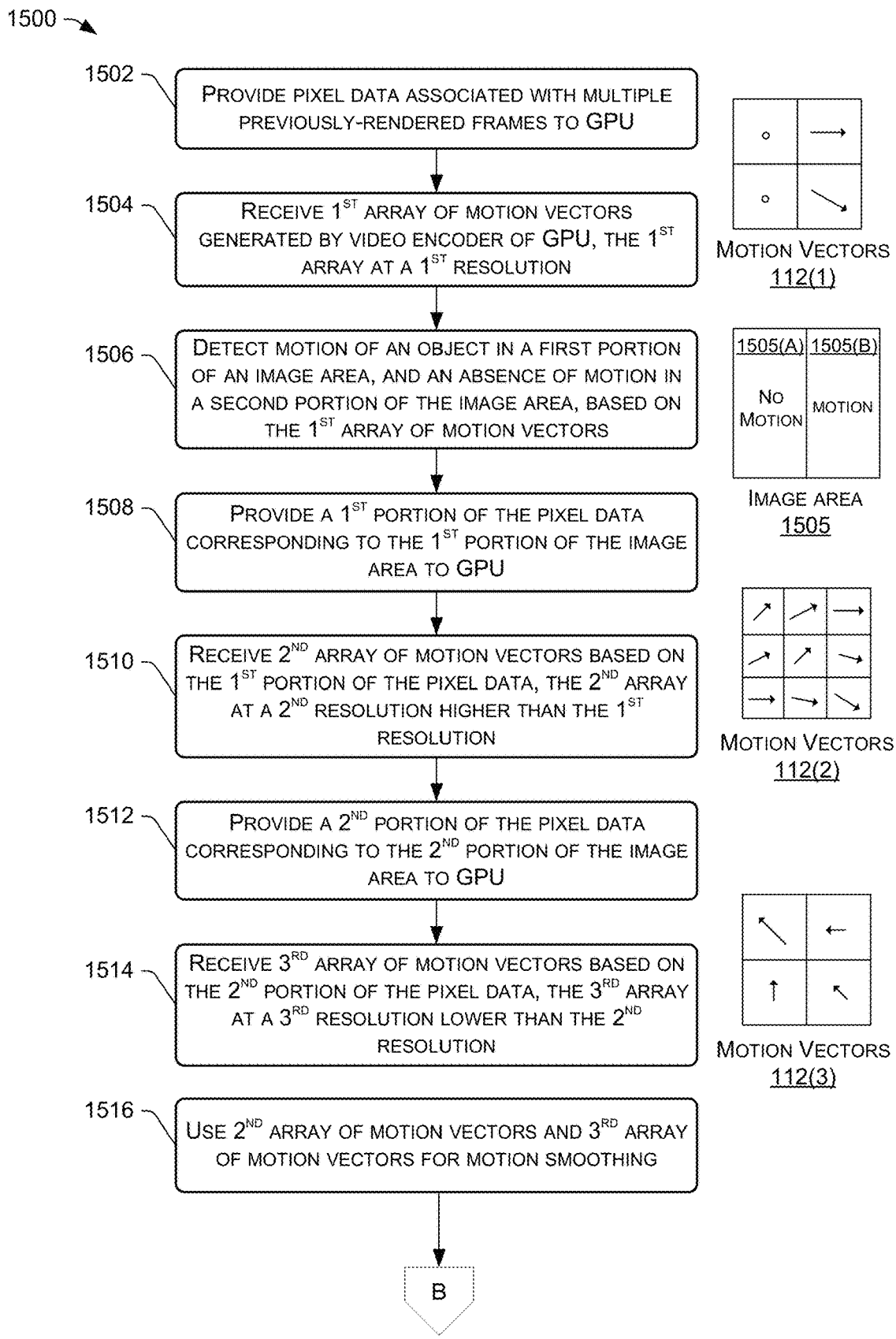
FIG. 15 is a flow diagram of an example process for obtaining multiple arrays of motion vectors at different resolutions for different portions of the image area, in accordance with embodiments disclosed herein.

FIG. 15 is a flow diagram of an example process 1500 for obtaining multiple arrays of motion vectors at different resolutions for different portions of the image area, in accordance with embodiments disclosed herein. For discussion purposes, the process 1500 is described with reference to the previous figures. Furthermore, as shown by the off-page reference "B" in FIGS. 3 and 15, the process 1500 may represent operations that are performed prior to the operations at block 306 of FIG. 3, and the process 1500 may, in some embodiments, continue with the operations of blocks 306-314.

At 1502, logic of a display system (e.g., logic of a HMD 100) may provide pixel data 108 associated with previously-rendered frames 104 as input to a GPU 110. The operation(s) performed at block 1502 may be similar to those described with respect to block 302 of the process 300.

At 1504, the logic may receive a first array of motion vectors 112(1) from the GPU 110, the first array of motion vectors 112(1) being received at, or otherwise up-sampled or down-sampled to, a first resolution.

At 1506, the logic may detect an absence of motion in a first portion 1505(A) of an image area 1505 spanning a display based at least in part on the first array of motion vectors 112(1), and may detect motion of an object 106 in a second portion 1505(B) of the image area 1505 based at least in part on the first array of motion vectors 112(1). For instance, non-zero motion vectors may be detected in a right half of the image area 1505, while the left half of the image area 1505 may contain zero-valued motion vectors without any non-zero motion vectors.

At 1508, the logic may provide a first portion of the first pixel data 108(1) (associated with the first frame 104(1)) and a first portion of the second pixel data 108(2) (associated with the second frame 104(2)) as input to the GPU 110. The first portion of the first pixel data 108(1) and the first portion of the second pixel data 108(2) may each correspond to the first portion 1505(A) of the image area 1505 where an absence of motion was detected at block 1506.

At 1510, the logic may receive, from the GPU 110, a second array of motion vectors 112(2) generated by the video encoder of the GPU 110 based at least in part on the first portion of the first pixel data 108(1) and the first portion of the second pixel data 108(2). This second array of motion vectors 112(2) may be generated at a second resolution that is a higher resolution than the first resolution of the first array of motion vectors 112(1). Obtaining a higher resolution motion vector field 112(2) for the first portion 1505(A) of the image area 1505 where an absence of motion was detected may be based on the notion that a motion vector field 112(2) at a higher resolution may help detect small-scale movement in the first portion 1505(A) of the image area 1505 where large-scale movement was not detected.

At 1512, the logic may provide a second portion of the first pixel data 108(1) (associated with the first frame 104(1)) and a second portion of the second pixel data 108(2) (associated with the second frame 104(2)) as input to the GPU 110. The second portion of the first pixel data 108(1) and the second portion of the second pixel data 108(2) may each correspond to the second portion 1505(B) of the image area 1505 where motion of an object 106 was detected at block 1506.

At 1514, the logic may receive, from the GPU 110, a third array of motion vectors 112(3) generated by the video encoder of the GPU 110 based at least in part on the second portion of the first pixel data 108(1) and the second portion of the second pixel data 108(2). This third array of motion vectors 112(3) may be generated at a third resolution that is a lower resolution than the second resolution of the second array of motion vectors 112(2). This relatively lower resolution motion vector field 112(3) for the second portion 1005(B) of the image area 1005 where motion was detected may be based on the notion that a higher resolution motion vector field may not be necessary to detect the movement in the second portion 1505(B) of the image area 1505 where large-scale movement was already detected at the first resolution of the first motion vector field 112(1).

At 1516, the logic may use the second array of motion vectors 112(2) and the third array of motion vectors 112(2) for motion smoothing. The process 1500 may continue from block 1516 to block 306 of the process 300 where pixel data 108(3) for a re-projected frame 104(3) is modified based on the motion vectors 112 from block 1516. In an example, using multiple arrays of motion vectors at block 1516 for motion smoothing may include the operations described with reference to block 1412 of the process 1400.

Figure 16:
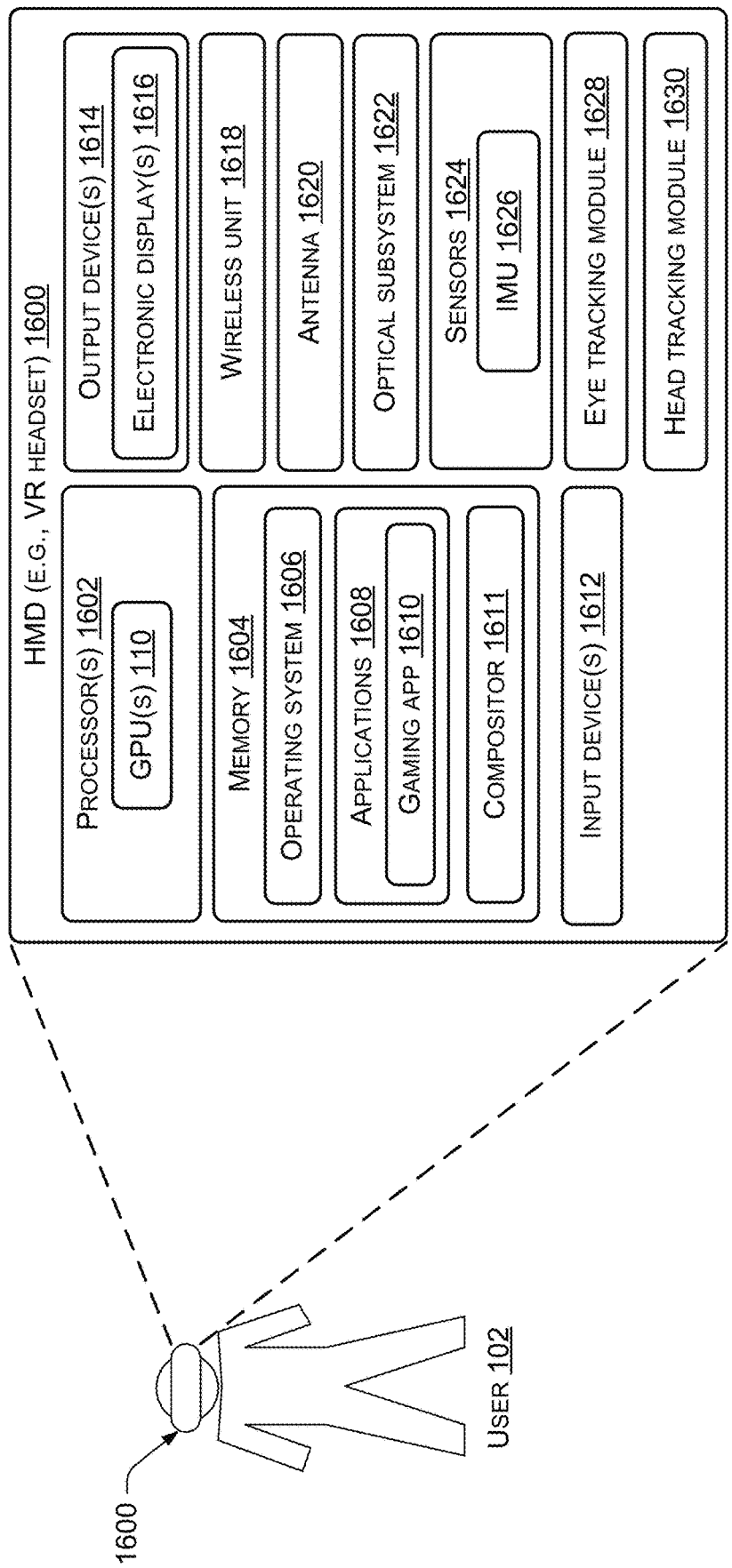
FIG. 16 illustrates example components of a wearable device, such as a VR headset, in which the techniques disclosed herein can be implemented.

FIG. 16 illustrates example components of a HMD 1600, such as a VR headset, according to the embodiments disclosed herein may be embedded. The HMD 1600 may be the same as, or similar to, the HMD 100 referenced in the previous figures, and, therefore, the components of the HMD 1600 shown in FIG. 16 may be implemented in the HMD 100. The HMD 1600 may be implemented as a standalone device that is to be worn by a user 102 (e.g., on a head of the user 102). In some embodiments, the HMD 1600 may be head-mountable, such as by allowing a user 102 to secure the HMD 1600 on his/her head using a securing mechanism (e.g., an adjustable band) that is sized to fit around a head of a user 102. In some embodiments, the HMD 1600 comprises a virtual reality (VR) or augmented reality (AR) headset that includes a near-eye or near-to-eye display(s). As such, the terms "wearable device", "wearable electronic device", "VR headset", "AR headset", and "head-mounted display (HMD)" may be used interchangeably herein to refer to the device 1600 of FIG. 16. However, it is to be appreciated that these types of devices are merely example of a HMD 1600, and it is to be appreciated that the HMD 1600 may be implemented in a variety of other form factors.

In the illustrated implementation, the HMD 1600 includes one or more processors 1602 and memory 1604 (e.g., computer-readable media 1604). In some implementations, the processors(s) 1602 may include a central processing unit (CPU), a graphics processing unit (GPU)(s) 110, both CPU and GPU 110, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1602 may possess its own local memory, which also may store program modules, program data, and/or one or more operating systems.

The memory 1604 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 1604 may be implemented as computer-readable storage media ("CRSM"), which may be any available physical media accessible by the processor(s) 1602 to execute instructions stored on the memory 1602. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1602.

In general, the HMD 1600 may include logic (e.g., software, hardware, and/or firmware, etc.) that is configured to implement the techniques, functionality, and/or operations described herein. The computer-readable media 1604 is shown as including various modules, such as instruction, datastores, and so forth, which may be configured to execute on the processor(s) 1602 for carrying out the techniques, functionality, and/or operations described herein. A few example functional modules are shown as stored in the computer-readable media 1604 and executable on the processor(s) 1602, although the same functionality may alternatively be implemented in hardware, firmware, or as a system on a chip (SOC), and/or other logic.

An operating system module 1606 may be configured to manage hardware within and coupled to the HMD 1600 for the benefit of other modules. In addition, in some instances the HMD 1600 may include one or more applications 1608 stored in the memory 1604 or otherwise accessible to the HMD 1600. In this implementation, the application(s) 1608 includes a gaming application 1610. However, the HMD 1600 may include any number or type of applications and is not limited to the specific example shown here. The gaming application 1610 may be configured to initiate gameplay of a video-based, interactive game (e.g., a VR game) that is playable by the user 102, and to output frames (e.g., actual frames 104) to be rendered on the display panels of the HMD 1600. A compositor 1611, in combination with other logic of the HMD 1600, may be configured to perform the motion smoothing techniques described herein to render motion-smoothed, re-projected frames 104.

Generally, the HMD 1600 has input devices 1612 and output devices 1614. The input devices 1612 may include control buttons. In some implementations, one or more microphones may function as input devices 1612 to receive audio input, such as user voice input. In some implementations, one or more cameras or other types of sensors (e.g., inertial measurement unit (IMU)) may function as input devices 1612 to receive gestural input, such as a hand and/or head motion of the user 102. In some embodiments, additional input devices 1612 may be provided in the form of a keyboard, keypad, mouse, touch screen, joystick, and the like. In other embodiments, the HMD 1600 may omit a keyboard, keypad, or other similar forms of mechanical input. Instead, the HMD 1600 may be implemented relatively simplistic forms of input device 1612, a network interface (wireless or wire-based), power, and processing/memory capabilities. For example, a limited set of one or more input components may be employed (e.g., a dedicated button to initiate a configuration, power on/off, etc.) so that the HMD 1600 can thereafter be used. In one implementation, the input device(s) 1612 may include control mechanisms, such as basic volume control button(s) for increasing/decreasing volume, as well as power and reset buttons.

The output devices 1614 may include a display(s) 1616, which may include one or multiple display panels (e.g., a stereo pair of display panels). The output devices 1614 may further include, without limitation, a light element (e.g., LED), a vibrator to create haptic sensations, a speaker(s) (e.g., headphones), and/or the like. There may also be a simple light element (e.g., LED) to indicate a state such as, for example, when power is on.

The HMD 1600 may further include a wireless unit 1618 coupled to an antenna 1620 to facilitate a wireless connection to a network. The wireless unit 1618 may implement one or more of various wireless technologies, such as Wi-Fi, Bluetooth, radio frequency (RF), and so on. It is to be appreciated that the HMD 1600 may further include physical ports to facilitate a wired connection to a network, a connected peripheral device (including a PC, game console, etc.), or a plug-in network device that communicates with other wireless networks.

The HMD 1600 may further include optical subsystem 1622 that directs light from the electronic display(s) 1616 to a user's eye(s) using one or more optical elements. The optical subsystem 1622 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 1622 may have one or more coatings, such as anti-reflective coatings. Magnification of the image light by optical subsystem 1622 allows electronic display(s) 1616 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 1622 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to electronic display(s) 1616 for display is pre-distorted, and optical subsystem 1622 corrects the distortion when it receives image light from electronic display(s) 1616 generated based on the content.

The HMD 1600 may further include one or more sensors 1624, such as sensors used to generate motion, position, and orientation data. These sensors 1624 may be or include gyroscopes, accelerometers, magnetometers, video cameras, color sensors, or other motion, position, and orientation sensors. The sensors 1624 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 1600 may include light sensors that are sensitive to light (e.g., infrared or visible light) that is projected or broadcast by base stations in the environment of the HMD 1600.

In an example, the sensor(s) 1624 may include an inertial measurement unit (IMU) 1626. IMU 1126 may be an electronic device that generates calibration data based on measurement signals received from accelerometers, gyroscopes, magnetometers, and/or other sensors suitable for detecting motion, correcting error associated with IMU 1626, or some combination thereof. Based on the measurement signals such motion-based sensors, such as the IMU 1626, may generate calibration data indicating an estimated position of HMD 1600 relative to an initial position of HMD 1600. For example, multiple accelerometers may measure translational motion (forward/back, up/down, left/right) and multiple gyroscopes may measure rotational motion (e.g., pitch, yaw, and roll). IMU 1626 can, for example, rapidly sample the measurement signals and calculate the estimated position of HMD 1600 from the sampled data. For example, IMU 1626 may integrate measurement signals received from the accelerometers over time to estimate a velocity vector and integrates the velocity vector over time to determine an estimated position of a reference point on HMD 1600. The reference point is a point that may be used to describe the position of the HMD 1600. While the reference point may generally be defined as a point in space, in various embodiments, reference point is defined as a point within HMD 1600 (e.g., a center of the IMU 1626). Alternatively, IMU 1626 provides the sampled measurement signals to an external console (or other computing device), which determines the calibration data.

The sensors 1624 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

As mentioned, in some embodiments, the sensors 1624 may include light sensors that are sensitive to light emitted by base stations in the environment of the HMD 1600 for purposes of tracking position and/or orientation, pose, etc., of the HMD 1600 in 3D space. The calculation of position and/or orientation may be based on timing characteristics of light pulses and the presence or absence of light detected by the sensors 1624.

The HMD 1600 may further include an eye tracking module 1628. A camera or other optical sensor inside HMD 1600 may capture image information of a user's eyes, and eye tracking module 1628 may use the captured information to determine interpupillary distance, interocular distance, a three-dimensional (3D) position of each eye relative to HMD 1600 (e.g., for distortion adjustment purposes), including a magnitude of torsion and rotation (i.e., roll, pitch, and yaw) and gaze directions for each eye. In one example, infrared light is emitted within HMD 1600 and reflected from each eye. The reflected light is received or detected by a camera of the HMD 1600 and analyzed to extract eye rotation from changes in the infrared light reflected by each eye. Many methods for tracking the eyes of a user 102 can be used by eye tracking module 1628. Accordingly, eye tracking module 1628 may track up to six degrees of freedom of each eye (i.e., 3D position, roll, pitch, and yaw) and at least a subset of the tracked quantities may be combined from two eyes of a user 102 to estimate a gaze point (i.e., a 3D location or position in the virtual scene where the user is looking). For example, eye tracking module 1628 may integrate information from past measurements, measurements identifying a position of a user's 102 head, and 3D information describing a scene presented by electronic display(s) 1616. Thus, information for the position and orientation of the user's 102 eyes is used to determine the gaze point in a virtual scene presented by HMD 1600 where the user 102 is looking.

The HMD 1600 may further include a head tracking module 1630. The head tracking module 1630 may leverage one or more of the sensor 1624 to track head motion, including head rotation, of the user 102, as described above. For example, the head tracking module 1630 can track up to six degrees of freedom of the HMD 1600 (i.e., 3D position, roll, pitch, and yaw). These calculations can be made at every frame 104 of a series of frames 104 so that the application 1608 can determine how to render a scene in the next frame 104 (even for re-projected frames 104) in accordance with the head position and orientation. In some embodiments, the head tracking module 1630 is configured to predict a future position and/or orientation of the HMD 1600 based on current and/or past data. This is because the application is asked to render a frame 104 before the user 102 actually sees the light (and, hence, the image) on the display(s) 1616. Accordingly, a next frame 104 can be rendered based on this future prediction of head position and/or orientation that was made at an earlier point in time, such as roughly 25-30 milliseconds (ms) prior to rendering the frame 104. Rotation data provided by the head tracking module 1630 can be used to determine both direction of HMD 1600 rotation, and amount of HMD 1600 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 1600.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
providing, as input to a graphics processing unit (GPU) of a head-mounted display (HMD):
  first pixel data associated with a first frame received from an application; and
  second pixel data associated with a second frame received from the application,
  wherein the second frame is a most recently rendered frame, and the first frame was rendered before the second frame;
receiving, from the GPU, an array of motion vectors generated by a video encoder of the GPU based at least in part on a comparison between the first pixel data and the second pixel data;
generating, based at least in part on the second pixel data, third pixel data for a re-projected frame;
generating a render mesh for the re-projected frame, the render mesh comprising a tessellated mesh having a plurality of vertices at a resolution that matches a resolution of the array of motion vectors;
moving, based at least in part on non-zero motion vectors among the array of motion vectors, vertices of the plurality of vertices in directions of the non-zero motion vectors to different locations within the render mesh as moved vertices;
modifying the third pixel data in accordance with the moved vertices of the render mesh to obtain modified third pixel data for the re-projected frame; and
rendering the re-projected frame on a display panel of the HMD based at least in part on the modified third pixel data.

2. The method of claim 1, wherein the first pixel data is output to a frame buffer before the second pixel data is output to the frame buffer, causing the first frame to be rendered before the second frame, and wherein the second pixel data is output to the frame buffer before the modified third pixel data is output to the frame buffer, causing the second frame to be rendered before the re-projected frame.

3. The method of claim 1, wherein providing, as the input to the GPU of the HMD, the first pixel data and the second pixel data comprises providing, as the input to the GPU of the HMD, a portion of the first pixel data and a portion of the second pixel data that each corresponds to pixels other than a subset of pixels at one or more edges of the display panel.

4. The method of claim 1, wherein a portion of the first pixel data and a portion of the second pixel data each represents data corresponding to a panel mask rendered at a periphery of the display panel, the method further comprising:
determining, based on rotation data provided by a head tracking module of the HMD, that the HMD has rotated from a first orientation to a second orientation between rendering the first frame and rendering the second frame;
modifying the first pixel data to obtain modified first pixel data that aligns a scene in the first frame with the second orientation of the HMD, wherein a portion of the modified first pixel data represents the data corresponding to the panel mask;
modifying the second pixel data to obtain modified second pixel data that aligns a scene in the second frame with the first orientation of the HMD, wherein a portion of the modified second pixel data represents the data corresponding to the panel mask; and
combining the portion of the modified first pixel data with the portion of the modified second pixel data to determine a subset of pixels having a common pixel value that corresponds to the panel mask,
wherein providing, as the input to the GPU of the HMD, the first pixel data and the second pixel data comprises providing, as the input to the GPU of the HMD, a particular portion of the first pixel data and a particular portion of second pixel data that each corresponds to pixels other than the subset of pixels.

5. A method comprising:
providing, as input to a graphics processing unit (GPU):
  first pixel data associated with a first frame received from an application, the first frame having been rendered in the past; and
  second pixel data associated with a second frame received from the application, the second frame having been rendered in the past after the first frame;
receiving, from the GPU, an array of motion vectors generated by a video encoder of the GPU based at least in part on the first pixel data and the second pixel data;
generating an attenuation texture overlaid on the array of motion vectors;
decreasing magnitudes of one or more motion vectors of the array of motion vectors using the attenuation texture to obtain a modified array of motion vectors;
generating, based at least in part on the second pixel data, third pixel data for a re-projected frame;
modifying the third pixel data based at least in part on the modified array of motion vectors to obtain modified third pixel data for the re-projected frame; and
rendering the re-projected frame on a display based at least in part on the modified third pixel data.

6. The method of claim 5, wherein the first pixel data is output to a frame buffer before the second pixel data is output to the frame buffer, causing the first frame to be rendered before the second frame, and wherein the second pixel data is output to the frame buffer before the modified third pixel data is output to the frame buffer, causing the second frame to be rendered before the re-projected frame.

7. The method of claim 5, further comprising:
generating a render mesh for the re-projected frame, the render mesh comprising a tessellated mesh having a plurality of vertices; and
moving, based at least in part on non-zero motion vectors among the modified array of motion vectors, vertices of the plurality of vertices to different locations within the render mesh as moved vertices,
wherein modifying the third pixel data based at least in part on the modified array of motion vectors comprises moving pixel values of the third pixel data in accordance with the moved vertices of the render mesh to obtain the modified third pixel data for the re-projected frame.

8. The method of claim 5, wherein the display is a head-mounted display (HMD), the method further comprising:
determining, based on rotation data provided by a head tracking module of the HMD, that the HMD has rotated from a first orientation to a second orientation between rendering the first frame and rendering the second frame; and
modifying at least one of:
  the first pixel data to obtain modified first pixel data that aligns a scene in the first frame with the second orientation of the HMD; or the second pixel data to obtain modified second pixel data that aligns a scene in the second frame with the first orientation of the HMD;
wherein providing, as the input to the GPU of the HMD, the first pixel data and the second pixel data comprises providing, as the input to the GPU of the HMD, at least one of the modified first pixel data or the modified second pixel data.

9. The method of claim 5, wherein providing, as the input to the GPU, the first pixel data and the second pixel data comprises providing, as the input to the GPU, a portion of the first pixel data and a portion of the second pixel data that each corresponds to pixels other than a subset of pixels at one or more edges of the display.

10. The method of claim 5, wherein the display is a head-mounted display (HMD), and wherein a portion of the first pixel data and a portion of the second pixel data each represents data corresponding to a panel mask rendered at a periphery of a display panel of the HMD, the method further comprising:
determining, based on rotation data provided by a head tracking module of the HMD, that the HMD has rotated from a first orientation to a second orientation between rendering the first frame and rendering the second frame;
modifying the first pixel data to obtain modified first pixel data that aligns a scene in the first frame with the second orientation of the HMD, wherein a portion of the modified first pixel data represents the data corresponding to the panel mask;
modifying the second pixel data to obtain modified second pixel data that aligns a scene in the second frame with the first orientation of the HMD, wherein a portion of the modified second pixel data represents the data corresponding to the panel mask; and
combining the portion of the modified first pixel data with the portion of the modified second pixel data to determine a subset of pixels having a common pixel value that corresponds to the panel mask,
wherein providing, as the input to the GPU of the HMD, the first pixel data and the second pixel data comprises providing, as the input to the GPU of the HMD, a particular portion of the first pixel data and a particular portion of second pixel data that each corresponds to pixels other than the subset of pixels.

11. The method of claim 5, further comprising:
comparing magnitudes of the array of motion vectors to a threshold magnitude;
determining that a subset of motion vectors of the array of motion vectors have magnitudes greater than the threshold magnitude; and
decreasing the magnitudes of the subset of motion vectors to obtain the modified array of motion vectors.

12. The method of claim 5, wherein the first frame and the second frame were rendered consecutively in a series of frames.

13. The method of claim 5, wherein the first pixel data comprises first chroma data and the second pixel data comprises second chroma data, and wherein the array of motion vectors is a first array of motion vectors generated by the video encoder of the GPU based at least in part on the first chroma data and the second chroma data, the method further comprising:
providing, as second input to the GPU:
first luma data associated with the first frame; and
second luma data associated with the second frame;
receiving, from the GPU, a second array of motion vectors generated by the video encoder of the GPU based at least in part on the first luma data and the second luma data; and
selecting one of the first array of motion vectors or the second array of motion vectors as a selected array of motion vectors based on an analysis of the first array of motion vectors and the second array of motion vectors,
wherein the modified array of motion vectors used to modify the third pixel data is based on the selected array of motion vectors.

14. The method of claim 5, wherein the array of motion vectors is a first array of motion vectors, the method further comprising:
rotating the first frame by a first amount of rotation to obtain a first rotated frame;
rotating the second frame by a second amount of rotation to obtain a second rotated frame;
providing, as second input to the GPU:
third pixel data associated with the first rotated frame; and
fourth pixel data associated with the second rotated frame;
receiving, from the GPU, and based at least in part on the third pixel data and the fourth pixel data, a second array of motion vectors;
determining differences in at least one of directions or magnitudes of motion vectors in the first array of motion vectors and the second array of motion vectors; and
generating a final array of motion vectors based at least in part on the differences,
wherein the modified array of motion vectors used to modify the third pixel data is based on the final array of motion vectors.

15. The method of claim 5, wherein the array of motion vectors is a first array of motion vectors at a first resolution, the method further comprising:
detecting an absence of motion in a first portion of an image area spanning the display based at least in part on the first array of motion vectors;
detecting motion of an object in a second portion of the image area based at least in part on the first array of motion vectors;
providing, as additional input to the GPU:
a first portion of the first pixel data corresponding to the first portion of the image area;
a first portion of the second pixel data corresponding to the first portion of the image area;
a second portion of the first pixel data corresponding to the second portion of the image area; and
a second portion of the second pixel data corresponding to the second portion of the image area;
receiving, from the GPU, a second array of motion vectors generated by the video encoder of the GPU based at least in part on the first portion of the first pixel data and the first portion of the second pixel data, the second array of motion vectors being generated at a second resolution that is a higher resolution than the first resolution; and
receiving, from the GPU, a third array of motion vectors generated by the video encoder of the GPU based at least in part on the second portion of the first pixel data and the second portion of the second pixel data, the third array of motion vectors being generated at a third resolution that is a lower resolution than the second resolution, wherein the modified array of motion vectors used to modify the third pixel data is based on the second array of motion vectors and the third array of motion vectors.

16. The method of claim 5, wherein modifying the third pixel data further comprises utilizing a depth buffer to determine a final set of pixel values for a frame buffer of the modified third pixel data.

17. The method of claim 5, further comprising:
comparing color pixel values between the first pixel data and the second pixel data to determine individual color difference values that correspond to individual motion vectors in the array of motion vectors;
determine a subset of motion vectors that are associated with color difference values that are less than a threshold color difference; and
decreasing magnitudes of the subset of motion vectors to zero to obtain the modified array of motion vectors.

18. A system comprising:
a display;
a graphics processing unit (GPU); and
logic configured to:
provide, as input to the GPU:
first pixel data associated with a first frame received from an application, the first frame having been previously rendered; and
second pixel data associated with a second frame received from the application, the second frame having been previously rendered after the first frame;
receive, from the GPU, an array of motion vectors generated by a video encoder of the GPU based at least in part on the first pixel data and the second pixel data;
generate, based at least in part on the second pixel data, third pixel data for a re-projected frame;
generate a render mesh for the re-projected frame;
move, based at least in part on non-zero motion vectors among the array of motion vectors, vertices of the render mesh to different locations within the render mesh as moved vertices;
modify the third pixel data based at least in part on the moved vertices of the render mesh to obtain modified third pixel data for the re-projected frame; and
render the re-projected frame on the display based at least in part on the modified third pixel data.

19. The system of claim 18, wherein the logic is further configured to:
output the first pixel data to a frame buffer before the second pixel data is output to the frame buffer, causing the first frame to be rendered before the second frame; and
output the second pixel data to the frame buffer before the modified third pixel data is output to the frame buffer, causing the second frame to be rendered before the re-projected frame.

20. The system of claim 18, wherein:
the render mesh comprises a tessellated mesh having a plurality of vertices including the vertices
the vertices are moved (i) in directions of the non-zero motion vectors and (ii) by amounts corresponding to magnitudes of the non-zero motion vectors; and
modifying the third pixel data based at least in part on the moved vertices of the render mesh comprises moving pixel values of the third pixel data in accordance with the moved vertices of the render mesh to obtain the modified third pixel data for the re-projected frame.

21. The system of claim 18, wherein the display is a head-mounted display (HMD), and wherein the logic is further configured to:
determine, based on rotation data provided by a head tracking module of the HMD, that the HMD has rotated from a first orientation to a second orientation between rendering the first frame and rendering the second frame; and
modify at least one of:
the first pixel data to obtain modified first pixel data that aligns a scene in the first frame with the second orientation of the HMD; or
the second pixel data to obtain modified second pixel data that aligns a scene in the second frame with the first orientation of the HMD;
wherein providing, as the input to the GPU of the HMD, the first pixel data and the second pixel data comprises providing, as the input to the GPU of the HMD, at least one of the modified first pixel data or the modified second pixel data.

22. The system of claim 18, wherein the logic is further configured to:
compare color pixel values between the first pixel data and the second pixel data to determine individual color difference values that correspond to individual motion vectors in the array of motion vectors;
determine a subset of motion vectors that are associated with color difference values that are less than a threshold color difference; and
decreasing magnitudes of the subset of motion vectors to zero to obtain a modified array of motion vectors,
wherein moving the vertices of the render mesh based at least in part on the non-zero motion vectors comprises modifying the third pixel data based on non-zero motion vectors among the modified array of motion vectors.

23. The system of claim 18, wherein the first pixel data comprises first chroma data and the second pixel data comprises second chroma data, wherein the array of motion vectors is a first array of motion vectors generated by the video encoder of the GPU based at least in part on the first chroma data and the second chroma data, and wherein the logic is further configured to:
provide, as second input to the GPU:
first luma data associated with the first frame; and
second luma data associated with the second frame;
receive, from the GPU, a second array of motion vectors generated by the video encoder of the GPU based at least in part on the first luma data and the second luma data; and
select one of the first array of motion vectors or the second array of motion vectors as a selected array of motion vectors based on an analysis of the first array of motion vectors and the second array of motion vectors,
wherein the non-zero motion vectors used to move the vertices of the render mesh comprises non-zero motion vectors among the selected array of motion vectors.

24. The system of claim 18, wherein the logic is further configured to apply at least one of:
a scalar median filter to the array of motion vectors to obtain a modified array of motion vectors; or
an average-max blur filter to the array of motion vectors to obtain the modified array of motion vectors,
wherein moving the vertices of the render mesh based at least in part on the non-zero motion vectors comprises modifying the third pixel data based on non-zero motion vectors among the modified array of motion vectors.

\* \* \* \* \*